United States Patent [19]

Yamashita et al.

[11] Patent Number: 5,428,461
[45] Date of Patent: Jun. 27, 1995

[54] REDUCTION IMAGE CONVERTING DEVICE

[75] Inventors: Haruo Yamashita, Ibaragi; Takashi Yumiba, Osaka, both of Japan

[73] Assignee: Matsushita Electric Industrial Co., Ltd., Osaka, Japan

[21] Appl. No.: 168,518

[22] Filed: Dec. 15, 1993

[30] Foreign Application Priority Data

Dec. 16, 1992 [JP] Japan .................................. 4-336296

[51] Int. Cl.⁶ ............................................. H04N 1/40
[52] U.S. Cl. ..................................... 358/451; 358/454
[58] Field of Search ............................... 358/451–454; 348/240; 382/47

[56] References Cited

U.S. PATENT DOCUMENTS

| | | | |
|---|---|---|---|
| 4,827,353 | 5/1989 | Ehlers et al. | 358/283 |
| 4,893,258 | 1/1990 | Sakuragi | 358/451 |
| 4,920,501 | 4/1990 | Sullivan et al. | 364/518 |
| 4,937,677 | 6/1990 | van Dorsselaer | 358/451 |
| 5,041,920 | 8/1991 | Hayes et al. | 358/456 |
| 5,050,000 | 9/1991 | Ng | 358/298 |
| 5,309,253 | 5/1994 | Ariga et al. | 358/451 |
| 5,317,417 | 5/1994 | Yamamura et al. | 358/451 |

FOREIGN PATENT DOCUMENTS 61-194973 8/1986 Japan .
62-126477 6/1987 Japan .
1222964 6/1989 Japan .
2271423 11/1990 Japan .

Primary Examiner—Stephen Brinich
Attorney, Agent, or Firm—Price, Gess & Ubell

[57] ABSTRACT

An image data processing-device for converting first image data into second image data by reducing the first image data horizontally at a reduction rate of $1/K_x$ while reducing the first image data vertically at a reduction rate of $1/K_y$, in which integer parts of $K_x$ and $K_y$ are $A_x$ and $A_y$ respectively while floating-point parts of $K_x$ and $K_y$ are $\alpha_x$ and $\alpha_y$ respectively. Such image data processing device comprises a first memory for holding said first image data, a second memory having an area where said gray-level pixel data will be stored, an area setting unit for setting a rectangle-shaped area of the first image data which corresponds to each pixel of the second image data, the rectangle-shaped area having $L_y$ pixel lines and $L_x$ pixel columns, in which $L_y$ is $A_y+1$ at a possibility of $\alpha_y$ or $A_y$ at a possibility of $1-\alpha_y$ while $L_x$ is $A_x+1$ at a possibility of 60 $_x$ or $A_x$ at a possibility of $1-\alpha_x$, an area readout unit for reading out a pixel level of every pixel held in each rectangle-shaped area, and outputting the pixel levels, an operation unit for integrating a pixel level of each rectangle-shaped area and obtaining gray-level pixel data by applying a predetermined operation to the integration result, and a writing unit for writing the gray-level pixel data into the second memory, the gray-level pixel data corresponding to the rectangle-shaped area of the first memory.

60 Claims, 13 Drawing Sheets k = 2 k = 3 k = 4

(A)

k = 2

(B)

k = 3

(C)

k = 4

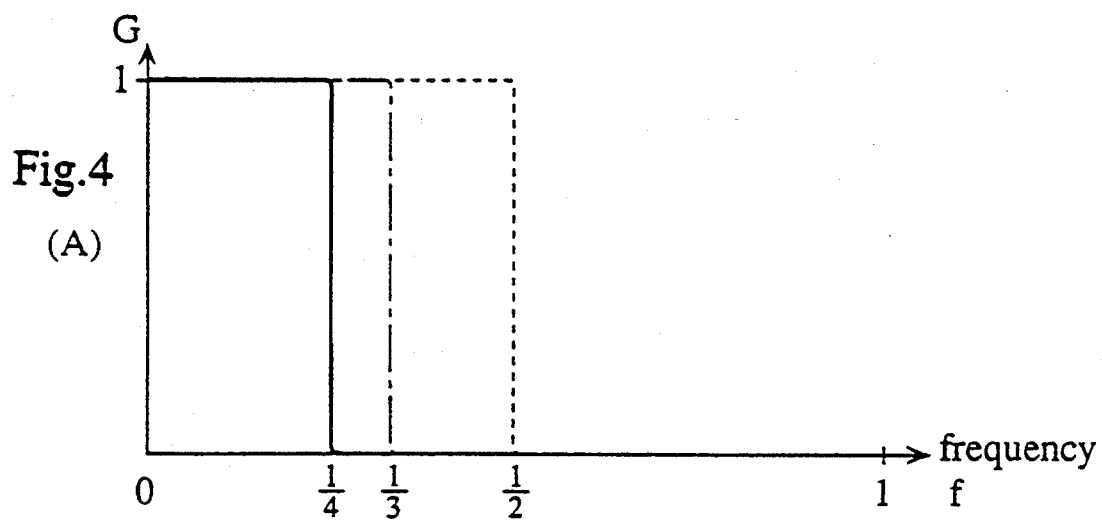
Fig.4 (A) PRIOR ART
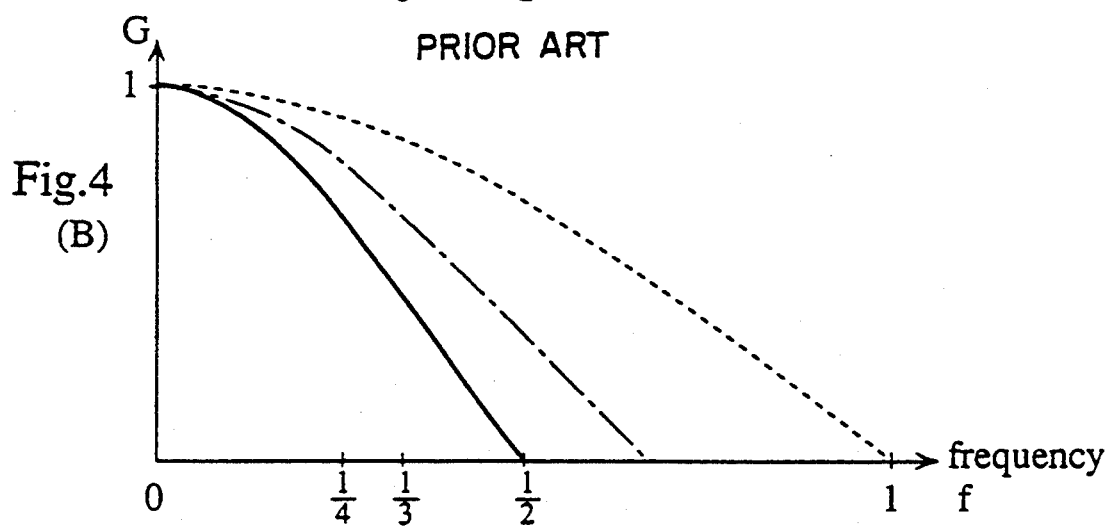
Fig.4 (B) PRIOR ART
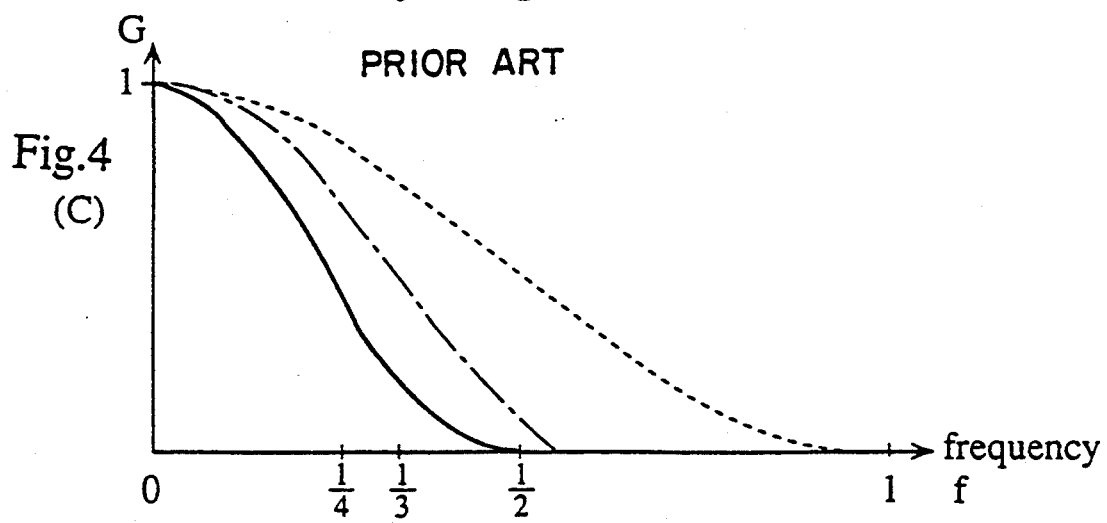
Fig.4 (C) PRIOR ART Fig.5 (A) PRIOR ART
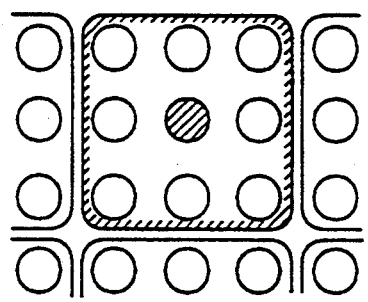
Fig.5 (B) PRIOR ART
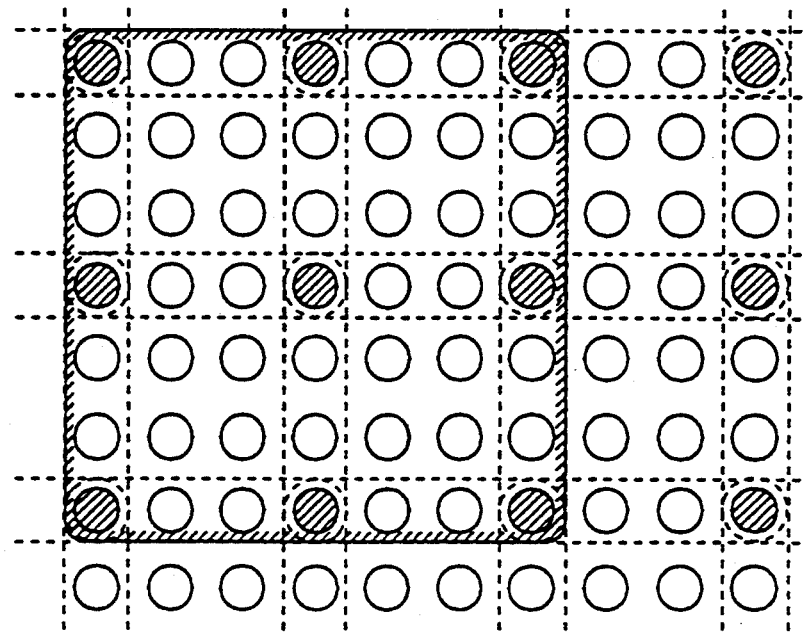

REDUCTION IMAGE CONVERTING DEVICE

BACKGROUND OF THE INVENTION (1) Field of the Invention

The present invention relates to an image data processing device for reducing a high resolution image which was scanned with an image scanner or with a computer to be outputted with a display device or a video printer as minimizing degradation in-quality and visibility, the display device and the video printer constructed to output a low resolution image.

(2) Description of the Related Art

Recently there has been an increasing demand of an image data processing device to be employed by an image filing system or the like. Receiving binary input data from an image input device such as an image scanner, the image data processing device displays or edits the data, stores the data into an external storage such as a magnetic disc or an optical disc, or outputs the data with a display device or a printing device.

Japanese Patent Publication No. 3-3256 discloses an example of an image processing device including the image data processing device, and this will be described as referring to FIG. 1. The conventional image processing device in FIG. 1 comprises a Central Processing Unit (CPU) 100, a Cathode-Ray Tube (CRT) 101, a main memory 102, an image memory 103, an image scanner 104, a scanner interface (scanner I/F) 105, an external storage 106, and an external storage interface (external storage I/F) 107.

The CPU 100 controls a whole operation of the image processing device.

The CRT 101 works as an image display device.

The main memory 102 is for the CPU 100.

The image memory 103 is for image display use, and operates separately from the main memory 102. That is, the image memory 103 holds image data to be displayed with the CRT 101.

The image scanner 104 scans a paper document.

The scanner I/F 105 transfers binary data of a paper document from the image scanner 104 to the image memory 103.

The external storage 106 is comprised of a magnetic disc device or an optical disc device.

The external storage I/F 107 transfers the binary data of the paper document from the image scanner 104 to an external storage 106; further transfers the binary data from the external storage 106 to the image data memory 103 if necessary.

Although the above image processing device has both the main memory 102 and the image memory 103, a general personal computer does not have an image memory 103, and it stores binary data into the main memory 102.

With the above conventional image processing device, the input data scanned with the image scanner 104 is reduced by the CPU 100 to be outputted with the CRT 101. That is, the CPU 100 thins out the input data by removing pixels in the input data at a certain interval; as a result, the whole layout of the input data can be displayed with the CRT 101 at one time. Otherwise, the input data will be displayed part by part, so that only a part of the input data will be displayed at one time. For ease of the description, the former display mode will be referred to as a thin out display mode while the latter display mode will be referred to as a regular display mode hereunder.

Generally the thin out display mode is employed in edition such as displacement, magnification, reduction, and rotation of an image since it provides the user with the whole layout of input data at one time. The thin out reduction is also realized by Or system. It is generally true that binary input data includes less black information than white information. Therefore, in the Or system, binary input data is divided into a number of small cells, and the cell including at least one black pixel is considered as a black pixel.

With the thin out display mode, however, the display loses detail in data, such as characters and lines. Accordingly, data are displayed at the regular display mode if detail in data is needed.

Thus, as for binary input data, visibility is enhanced by the thin out reduction. As for gray-level input data representing continuous tone image, on the other hand, quality level of input data should be sustained while enhancing visibility. When reduced at the thin out reduction mode, gray-level output data will lose detail; accordingly, unwanted visual effects and noise expansion such as moire, granular, and aliasing, will occur. Since such unwanted visual effects and noise expansion degrade quality of the output image, they should be decreased by the low-pass filtering of the visual system.

The concrete reduction of gray-level input data will be described as referring to figures. For simplifying the description, gray-level input data is one dimensional. At reduction of input data in FIGS. 2(A), (B), and (C), simple average of original pixel levels is computed. Taking FIG. 2(A) as an example, pixels at the upper row constitute original data and pixels at the lower row constitute reduced data. The reduction rate is one-second, in other words pixel level of each pixel at the lower row is computed in accordance with pixel levels of two corresponding pixels at the upper row (K=2). Each arrow shows a reduction operation. That is, pixel level of each pixel at the lower row is computed by multiplying pixel levels of corresponding pixels at the upper row by the coefficient which is equivalent to the reduction rate, then computing the sum of the multiplication results. Thus, the simple average of original pixel levels are computed to obtain a corresponding reduced pixel level. Such simple average can be computed with a low-pass filter. Similarly, in FIG. 2(B) the reduction rate is one-third and a reduced pixel level is obtained by computing a simple average of three original pixels levels. In FIG. 2 (C) the reduction rate is one-fourth and a reduced pixel level is obtained by computing a simple average of four original pixel levels. In the simple average computation, each original pixel is computed just once, and it can be realized with the most simple construction of a digital filter. Also the reduced data do not lose detail in the original data. Further, unwanted visual effects and noise expansion, such as moire, granular, and aliasing are removed by low-pass filtering of the visual system.

Another use of a FIR digital low pass-filter will be described as referring to FIGS. 3(A), (B), and (C). Different from the above, original pixels will be multiplied by weighting coefficients herein. To be noted, the sum of weighting coefficients to be applied to a reduced pixel is always one. Each reduced pixel contains information from some original pixels, and the number of the original pixels is called as a tap number. Generally filter characteristics are enhanced by a larger tap number.

The reduction rates in FIGS. 3(A), (B), (C) are half, one-third, and one-fourth respectively. That is, each reduced pixel level is computed from two original pixel levels in FIG. 3 (A) (K=2); each reduced pixel level is computed from three original pixel levels in FIG. 3(B) (K=3); and each reduced pixel level is computed from four original pixel levels in FIG. 3(C) (K=4). In the figures pixels at the upper row constitute original grey-level data while pixels at the lower row constitute reduced grey-level data. Each arrow represents a reduction operation. That is, each pixel level at the lower row is computed by multiplying corresponding pixel levels at the upper row by the coefficient placing on each arrow in the figures; then computing the sum of the multiplication results. The tap number for half reduction rate is 3; and tap numbers and Coefficients for the other reduction rates are determined to realize the substantially same filter characteristics. With half reduction rate in FIG. 3 (A), each reduced pixel includes information from three original pixels. On the other hand, with one-third and one-fourth reduction rates in FIG. 3 (B), (C), each reduced pixel includes information from as many as seven original pixels. It is well known that a larger tap number is required to gain good filter characteristics with a lower cutoff frequency or a cutoff frequency other than a radix fraction, $\frac{1}{2}*$ of a sampling frequency. With a larger tap number, a larger number of original pixels will be referred in generation of a reduced pixel.

The thin out reduction with weighting coefficients has disadvantages of the complicated computation circuit and the extended run time. That is, a complicated computation circuit is required to realize computation with weighting coefficients. Also an original pixel is employed repeatedly, and this extends the run time. In spite of these disadvantages, the thin out reduction with weighting coefficients is effective in that it realizes the reduction at any reduction rate. That is, input data can be reduced at a reduction rate $1/b$ even when b is non-integer, by setting a corresponding cutoff frequency.

FIGS. 4 (A), (B), (C) show ideal frequency distributions, frequency distributions at the reduction in FIG. 2, and frequency distributions at the reduction in FIG. 3 respectively. Each figure has a broken line for half reduction rate, a dashed line for one-third reduction rate, and a solid line for one-fourth reduction rate.

Compared to the ideal frequency distributions in FIG. 4(A), the frequencies in FIG. 4(B) has unwanted attenuated frequencies at passing of the filter, and unwanted residual frequencies at rejection with the filter. In the actual display, however, the low-pass filtering significantly enhances the quality of the reduced image. Comparing all the figures with each other, the frequency distributions in FIG. 4 (C) look alike the ideal frequency distributions in FIG. 4 (A) more than the frequency distributions in FIG. 4(B). If the tap number is raised by a larger filter, the frequency distributions will be more ideal than now.

Thus, although the simple average computation in FIG. 2 can be realized with simple construction of the computation circuit, the reduction rate must be expressed by a reduction rate $1/b$ where b is integer. On the other hand, although the average computation with weighting coefficients in FIG. 3 can realize reduction at any reduction rate, the computation circuit is complicated as well as the run time is extended.

Although input data in the above is one-dimensional, it is generally two-dimensional, such as FIGS. 5(A) and (B). FIG. 5(A) operates simple average computation while FIG. 5(B) operates average computation with weighting coefficients. In FIG. 5(A), a cross-hatched pixel is obtained by reducing the input data including 9 pixels arranged in a matrix of 3 lines and 3 columns. In FIG. 5(B), cross-hatched pixels are obtained by reducing the input data with the filter which is the matrix of 7 lines and 7 columns. To be precise, a weighted mean of 49 pixels is computed. An area including three pixels both in the X and Y directions is subjected to the filter operation, and many of the pixels in the area are referred repeatedly. For example, a pixel can be referred to in at most 9 computations. Accordingly, the circuit realizing the reduction is complicated as well as the run time is extended. Conventionally, when displaying the whole layout of input data scanned from a large document with an image scanner, the input data is thinned out in accordance with the thin out display mode. With the thin out reduction mode, however, the reduced data loses detail in the input data, such as thin lines. As a result, the visibility of the reduced image decreases by lacking original information, such as characters and diagrams. The visibility of the reduced image can be enhanced by raising the reduction rate. However, the raise of the reduction rate narrows a range of the data which can be displayed. Otherwise, the thin out display mode should be replaced by the regular display mode, so that a part of the data will be displayed in high visibility. Thus, conventionally the whole layout of a large document cannot be displayed at one time without degrading the visibility.

Also reduction of gray-level input data is limited to a reduction rate $1/b$ where b is integer, even though it achieves high quality of the reduced image. At other reduction rates, on the other hand, weighting average of the pixel levels should be computed instead of simple average thereof. The weighting average requires a complicated computation circuit since weighting coefficients are applied to original pixels; further, it requires long run time since original pixels are referred repeatedly. Also to set a reduction rate of a wide range, a number of computations are required; as a result, the circuit for memorizing coefficients and realizing computations will be more complicated. Along with the increase in the size of the circuit the run time is also extended.

SUMMARY OF THE INVENTION

Accordingly, it is an object of the present invention to provide a simply constructed image data processing device which is capable of reducing an image at any reduction rate while minimizing degradation in image quality.

The above object may be fulfilled by an image data processing device for converting first image data into second image data by reducing the first image data horizontally at a reduction rate of $1/K_x$ while reducing the first image data vertically at a reduction rate of $1/K_y$, in which integer parts of $K_x$ and $K_y$ are $A_x$ and $A_y$ respectively while floating-point parts of $K_x$ and $K_y$ are $\alpha_x$ and $\alpha_y$ respectively, the image data processing device comprising an area setting unit for setting a rectangle-shaped area of the first image data which corresponds to each pixel of the second image data, the rectangle-shaped area having $L_y$ pixel lines and $L_x$ pixel columns, in which $L_y$ is $A_y+1$ at a possibility of $\alpha_y$ or $A_y$ at a possibility of $1-\alpha_y$ while $L_x$ is $A_x+1$ at a possibility of $\alpha_x$ or $A_x$ at a possibility of $1-\alpha_x$, and an operation unit for integrating a pixel level of each rectangle-shaped area, and obtaining gray-level pixel data by applying a predetermined operation to the integration result.

With this construction, the area setting unit determines a rectangle-shaped area in the first image data, the rectangle-shaped area corresponding to each pixel in the second image data. The operation unit integrates pixel levels of each rectangle-shaped area, and obtains gray-level pixel data from a predetermined operation.

Thus, the bandwidth limitation, reduction, and conversion of binary data into ray-level data are conducted concurrently; therefore, a high-quality reduced image is realized by complementing details in information such as character information with continuous-tone information. Conventionally the details in information often fail to be reflected in the reduced image. Further, a size of the reduction is dynamically replaced by another at a possibility corresponding to the reduction rate. As a result, no overlap between pixels will occur. Also sum of multiplication results is not necessarily operated. Consequently, rapid reduction can be realized with a simply constructed computation circuit at a reduction rate 1/b where b is either integer or non-integer, as well as without aliasing noise such as moire.

Thus, even with a low resolution image display device, a wide range of original image data can be displayed without degrading the visibility. Since any reduction rate can be applied, the image data processing device can be employed with various combinations of an image input device and an image output device.

The above object may be fulfilled by an image data processing device for converting first image data into second image data by reducing the first image data horizontally at a reduction rate of $1/K_x$ while reducing the first image data vertically at a reduction rate of $1/K_y$, in which integer parts of $K_x$ and $K_y$ are $A_x$ and $A_y$ respectively while floating-point parts of $K_x$ and $K_y$ are $\alpha_x$ and $\alpha_y$ respectively, the image data processing device comprising a first memory for holding said first image data to be reduced, a second memory having an area where said gray-level pixel data will be stored, an area setting unit for setting a rectangle-shaped area of the first image data which corresponds to each pixel of the second image data, the rectangle-shaped area having $L_y$ pixel lines and $L_x$ pixel columns, in which $L_y$ is $A_y+1$ at a possibility of $\alpha_y$ or $A_y$ at a possibility of $1-\alpha_y$ while $L_x$ is $A_x+1$ at a possibility of $\alpha_x$ or $A_x$ at a possibility of $1-\alpha_x$, an area readout unit for reading out a pixel level of every pixel held in each rectangle-shaped area, and outputting the pixel levels to said operation unit, an operation unit for integrating a pixel level of each rectangle-shaped area, and obtaining gray-level pixel data by applying a predetermined operation to the integration result, and a writing unit for writing the gray-level pixel data into the second memory, the gray-level pixel data corresponding to the rectangle-shaped area of the first memory.

With this construction, the area setting unit sets a rectangle-shaped area which corresponds to each pixel in the second image data, the rectangle-shaped area including $L_x$ pixels in the X direction and $L_y$ pixels in the Y direction. The operation unit integrates the pixel level of each rectangle-shaped area read from the first memory, and obtains gray-level pixel data from a predetermined operation. The writing unit writes the gray-level pixel data from the operation unit into the second image memory as the pixel corresponding to the rectangle-shaped area. Accordingly, the same effects as the above will be gained.

The operation unit may be comprised of a calculation unit for counting the number of pixels representing a same color, either black or white, out of the pixels read out by the area read out unit for each rectangle-shaped area, a multiplier for computing $L_x \cdot L_y$ of the rectangle-shaped area which is subjected to the counting operation by the calculation unit, a divider for obtaining gray-level pixel data by dividing the counting number at the calculation unit by the multiplication result of the multiplier, wherein the first image data stored in the first memory is binary data.

With this construction, the calculation unit counts the number of black pixels within each rectangle-shaped area. Otherwise, the number of white pixels therein is counted. The divider obtains gray-level pixel data by dividing the counting number at the calculation unit by the multiplication result of the multiplier. Consequently, the binary image data in the first memory will be reduced into the gray-level image data. Thus, lack in the detail information caused at thin out reduction of the binary data will be complemented, as a result, high quality image without lack in detail can be obtained.

The operation unit may be comprised of an accumulator for computing a sum of the pixel levels read out by the area readout unit for each rectangle-shaped area, a multiplier for computing $L_x \cdot L_y$ of the rectangle-shaped area, the rectangle-shaped area whose pixel levels are totaled by the accumulator, and a divider for obtaining gray-level pixel data by dividing the sum at the accumulator by the multiplication result of the multiplier, wherein the first image data stored in the first memory is gray-level data.

With this construction, the accumulator integrates the pixel levels for each rectangle-shaped area in the image data read out by the area read out unit. The divider obtains gray-level pixel data by dividing the integration value from the accumulator by the multiplication result of the multiplier.

Accordingly, the gray-level first image data stored in the first memory can be reduced into the gray-level second image data. The lack in the detail information caused at the reduction of the gray-level data can be complemented with continuous-tone information. As a result, a high quality reduced image can be gained without lack in the detail.

The image data processing device may further comprise a correction unit for correcting non-linear factors of an image output device, the image output device outputting an image of the second image data, the second image data being the gray-level pixel data obtained by the divider.

With this construction, as for the gray-level pixel data obtained from the divider, the correction unit corrects non-linear factors of the image display device with which the second image data are displayed, and outputs it to the second image memory. Accordingly, the second image data displayed in accordance with the characteristics (non-linear factors) of the display device, realizes high image quality.

The correction unit may have a lookup table which indicates a plurality of input/output characteristics which correct non-linear factors of various image output devices, each of the input/output characteristics being selected in accordance with the selected image output device.

With this construction, various non-linear factors occurring until the image is optically viewed, such as γ characteristic being unique to a CRT or a video printer, adjustment of brightness and contrast at a CRT, a dot gain caused by wide spread of beam at a CRT and wide spread of dots at a CRT, are corrected by the γ correction unit.

Accordingly, the display with natural tone can be realized, as well as the maximum amount of information can be retrieved from the information removed at the thin out reduction.

The correction unit may have a lookup table which indicates a plurality of input/output characteristics, each of the input/output characteristics being selected in accordance with a sort of the first image data and a reduction rate.

With this construction, a line can be thickened by changing the ? characteristic in accordance with the reduction rate. Therefore, the visibility of the reduced image can be enhanced even with a large reduction rate and with the original image including a thin line.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 4(A), 4(B), and 4(C) show characteristics of the filters in the conventional image processing device of FIG. 1;

FIGS. 5(A) and 5(B) show a data reduction area of two-dimensional input data to be reduced with the convention image processing device of FIG. 1;

DESCRIPTION OF THE PREFERRED EMBODIMENT

An embodiment of the present invention will be described as referring to figures.

Overall Construction

Figure 1:
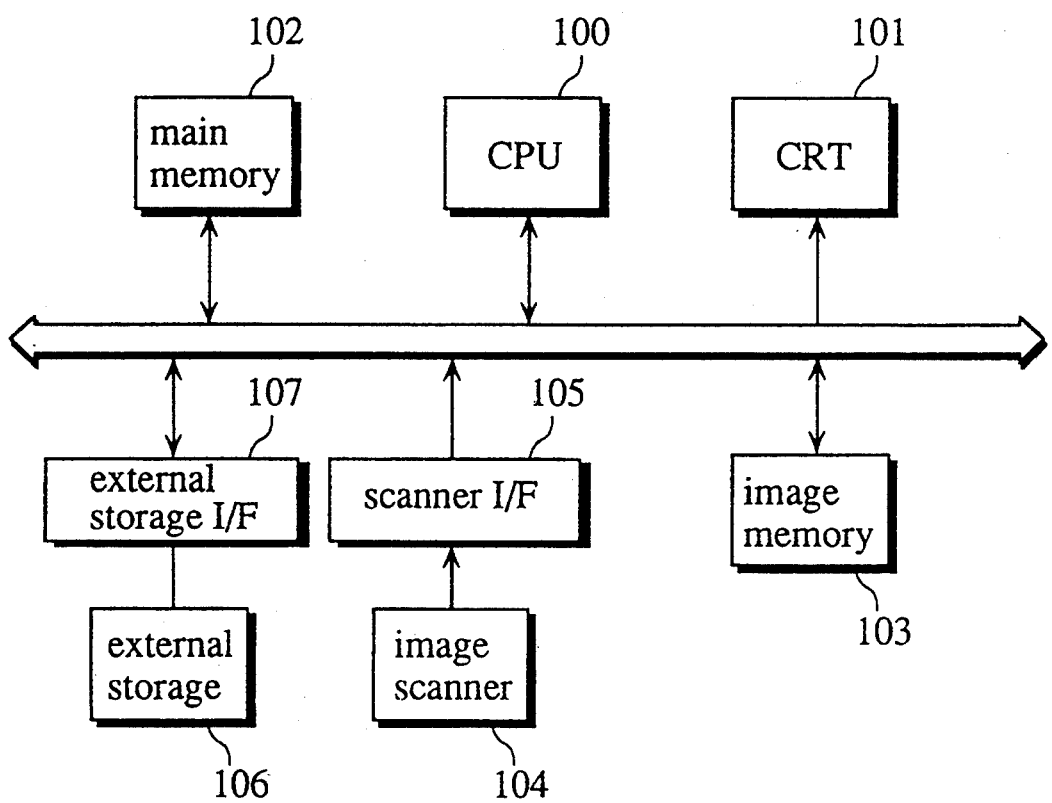
FIG. 1 shows construction of a conventional image processing device.
Figure 2:
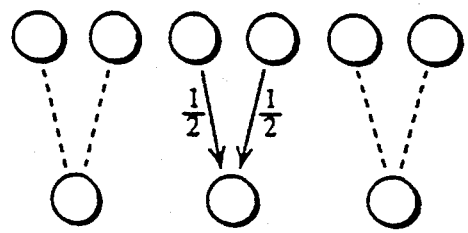
FIGS. 2(A), 2(B), and 2(C) show operation of a low-pass filter for a simple average computation in the conventional image processing device of FIG. 1.
Figure 2:
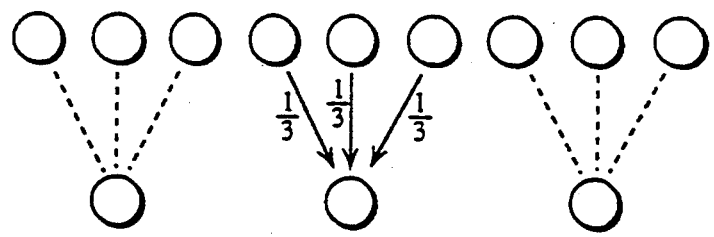
Figure 2:
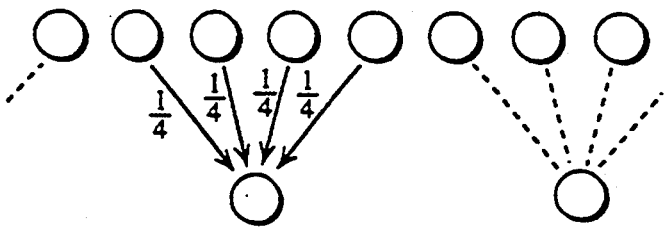
Figure 3:
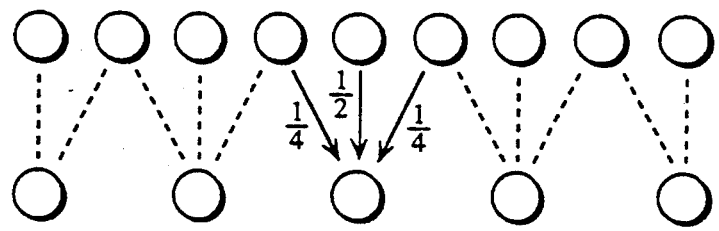
FIGS. 3(A), 3(B), and 3(C) show low-pass filtering of a FIR digital filter in the conventional image processing device of FIG. 1.
Figure 3:
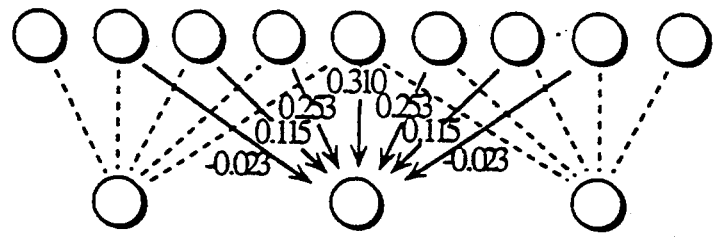
Figure 3:
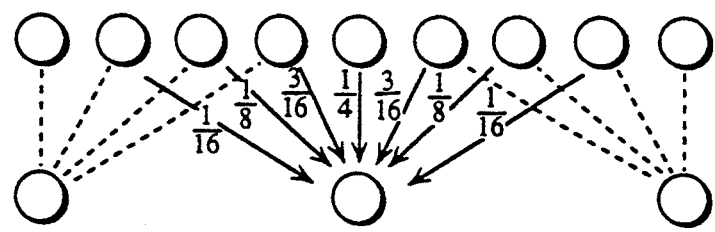
Figure 6:
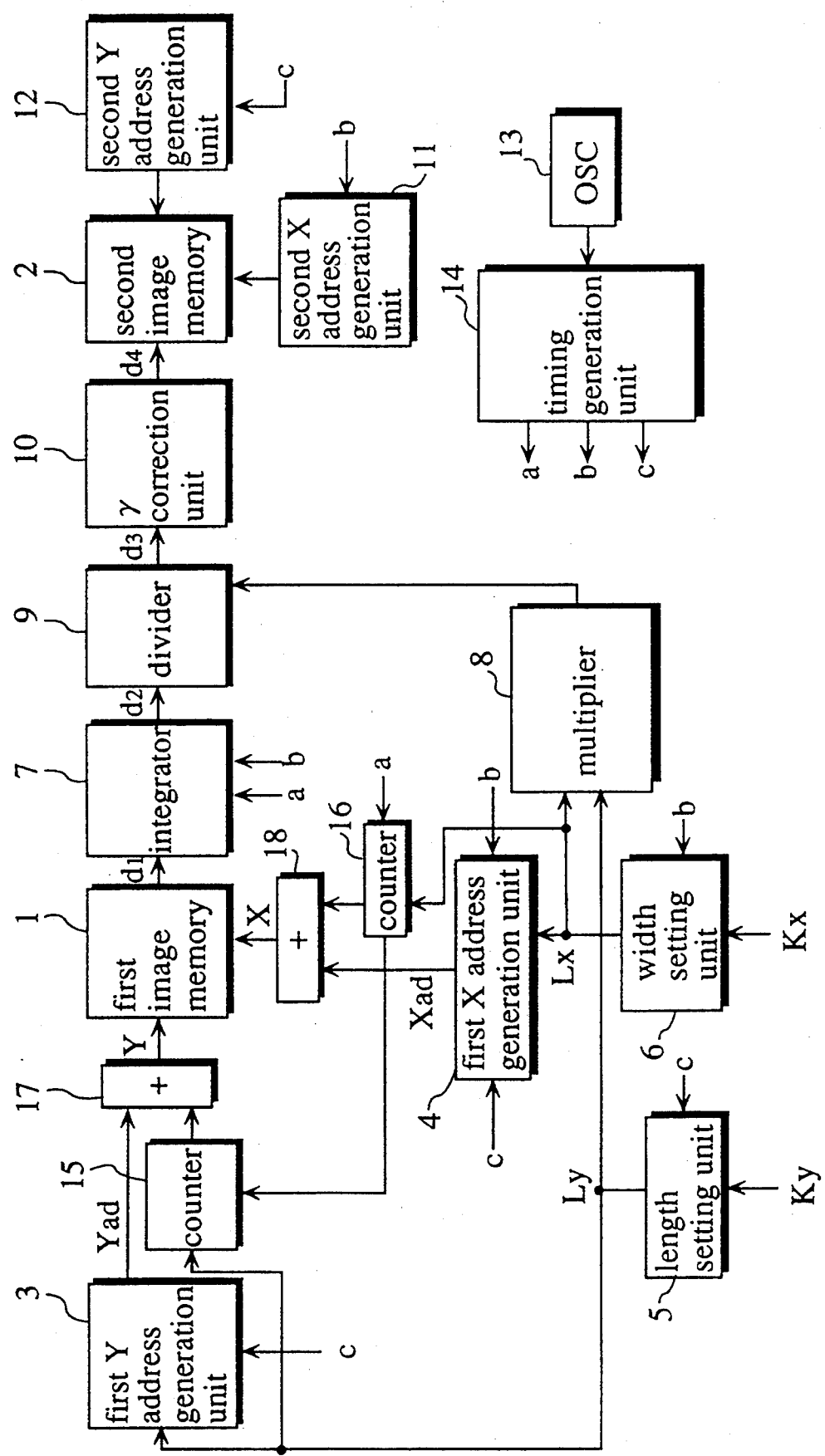
FIG. 6 shows construction of an image data processing device in a first embodiment of the present invention.

FIG. 6 shows construction of an image data processing device in this embodiment. In the figure, the image data processing device comprises a first image memory 1, a second image memory 2, a first Y address generation unit 3, a first X address generation unit 4, a length setting unit 5, a width setting unit 6, an integrator 7, a multiplier 8, a divider 9, a γ correction unit 10, a second X address generation unit 11, a second Y address generation unit 12, an oscillator 13, a timing generation unit 14, counters 15 and 16, and adders 17 and 18.

The first image memory 1 holds binary data. A pixel level of a pixel in binary input data is represented by $d_1$ ($d_1 = 0$ or 1).

The second image memory 2 holds gray-level reduced data corresponding to the binary input data stored in a predetermined data reduction area of the first image memory 1.

The first Y address generation unit 3 generates a reference Y address, $Y_{ad}$ of the first image memory 1.

The first X address generation unit 4 generates a reference X address, $X_{ad}$ of the first image memory 1.

The length setting unit 5 generates $L_y$ representing length of the data reduction area in the first image data memory 1.

The width address setting unit 6 generates $L_x$ representing width of the data reduction area in the first image data memory 1.

The integrator 7 integrates the pixel level $d_1$ of each data reduction area in the first image memory 1.

The multiplier 8 computes the number of the pixels stored in each data reduction area by multiplying output of the length setting unit 5 by output of the width setting unit 6.

The divider 9 normalizes the pixel level by dividing integration result of the integrator 7 by multiplication result of the multiplier 8.

The γ correction unit 10 applies non-linear continuous tone conversion to the normalized pixel level of each data reduction area.

The second X address generation unit 11 generates an X address of the second image memory 2 where output of the γ correction unit 10 will be stored.

The second Y address generation unit 12 generates an Y address of the second image memory 2 where output of the γ correction unit 10 will be stored.

The oscillator 13 generates a reference clock for a reduction processing.

The timing[generation unit 14 provides a timing signal to each component of the image data processing device by dividing the reference clock generated by the oscillator 13. To be precise, the timing generation unit 14 generates timing signals "a", "b", and "c" by dividing the reference clock generated by the oscillator 13. The timing signal "a" indicates a timing for reading out a pixel from the image memory 1. The timing signal "b" indicates a timing for making a round of the counter 15, whereby the pixels in the first image memory 1 corresponding to single pixel in the second image memory 2 are read out. The timing signal "c" indicates a timing for completing generation of one-line pixels at the second image memory 2.

The counter 15 generates a Y address offset for scanning the length of the data reduction area represented by $L_y$ from the length setting unit 5. To be precise, receiving $L_y$ from the length setting unit 5, the counter 15 counts from zero up to $L_y-1$, and reset to zero when it reaches to $L_y-1$.

The counter 16 generates an X address offset for scanning the width of the data reduction area represented by $L_x$ from the width setting unit 6. To be precise, receiving $L_x$ from the width setting unit 6, the counter 16 counts from zero up to $L_x-1$, and reset to zero when it reaches to $L_x-1$. The counter 16 is cascade connected to the counter 15, and the counter 16 outputs a clock to the counter when completing a round.

The adder 17 generates a Y address in the first image memory 1 by adding the reference Y address, $Y_{ad}$ and the Y address offset, $Y_{ad}$ generated by the first Y address generation unit 3 and the Y address offset generated by the counter 15.

The adder 18 generates an X address in the first image memory 1 by adding the reference X address, $X_{ad}$ and the X address offset, $X_{ad}$ generated by the first X address generation unit 4 and the X address offset generated by the counter 16.

Description of Operation

Operation of the image data processing device with the above construction will be described.

It is assumed herein that upper half of a A4 size document is scanned at 200 DPI (Dot Per Inch), and the storage area in the first image memory 1 for input data is a square matrix with 1720 pixels in the X direction (Mx=1720) and 1075 pixels in the Y direction (My=1075). The storage area in the second image memory 2 depends on a graphics component installed in a personal computer, and a general square matrix with 640 in the X direction (Nx=640) and 400 in the Y direction (Ny=400) is employed herein. Accordingly, (Mx-Nx) pixels out of Mx pixels are thinned out. In other words, the thin out interval Kx is $$\frac{Mx}{Nx} = 2,6875,$$

in which the integer part is 2 and the floating-point part is 0.6875. Similarly, (My-Ny) pixels out of My pixels are thinned out. In other words, the thin out interval is $$\frac{My}{Ny} = 2,6875,$$

in which the integer part is 2 and the floating-point part is 0.6875. The reduction rates in the X and Y directions are reverse of the thin out intervals, and both of them are 0.372 herein.

Figure 7:
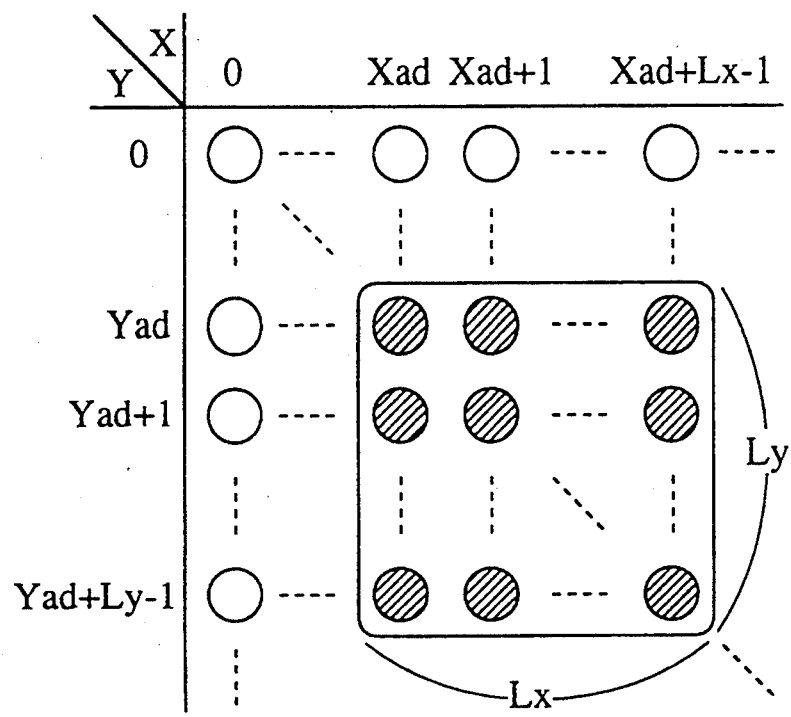
FIG. 7 shows relation between a reference address and a data reduction area of the first image memory.

FIG. 7 shows the data reduction area in the first image memory 1. In the figure an X coordinate represents an X address of the first image memory 1. Each X address is generated at the adder 18 by adding the reference address $X_{ad}$ and an X address offset which places between zero and $Lx-1$, the reference address $X_{ad}$ generated by the first X address generation unit 4 and the X address offset generated by the counter 16. Similarly, a Y coordinate represents a Y address in the first image memory 1. Each Y address is generated at the adder 17 by adding the reference address $Y_{ad}$ and a Y address offset which places between zero and $Ly-1$, the reference address $Y_{ad}$ generated by the first Y address generation unit 3 and the Y address offset generated by the counter 15. Further each of cross-hatched dots and white dots in the figure represents a pixel, and the cross-hatched dots constitute a data reduction area.

All of the first X address generation unit 4, the first Y address generation unit 3, the adders 17 and 18, the second X address generation unit 11, the second Y address generation 12, and the integrator 7 are initialized, and each of them outputs its initial value 0. In this case, 0 is outputted both as the X address and the Y address; accordingly, the pixel (0.0) is read out from the image data memory 1 and is sent to the adder 7.

At the timing signal "a", the counter is incremented by 1; as a result, the X address generated by the adder 18 becomes 1. Accordingly, the pixel (0, 1) is read out, and the integrator 7 integrates the pixel level of the pixel (0, 1) with the pixel level of the pixel (0, 0). Similarly, the pixels up to the pixel (0, Lx−1) are read out from the first image memory 1 one by one. Once the pixel (0, Lx−1) is read out, the counter 16 is reset to zero as well as the counter 16 outputs a clock signal to the counter 15. Because of the clock signal, the counter 15 is incremented by 1 and the pixel (1, 0) is read out.

The above operation is repeated $L_x.L_y$ times, and the pixels up to the pixel ($L_x-1, L_y-1$) are read out, while the integrator 7 integrates the pixel level $d_1$ of each pixel. The integration value at the integrator 7 reaches to $d_2$ when $L_x.L_y$ pixels corresponding to a pixel in the second image memory 2 are read out from the first image memory 1. During the readout of the pixels from the first image memory 1, the multiplier 8 multiplies the output from the length setting unit 5 by the output from the width setting unit 6 so that the number of the pixels whose pixel levels have been integrated by the integrator will be figured out.

The divider 9 normalizes the pixel levels by dividing the integration value $d_2$ at the integrator 7 by the pixel number computed by the multiplier 8; as a result, the normalized pixel value $d_3$ of the data reduction area will be detected. The γ correction unit 10 applies non-linear continuous-tone conversion to the normalized pixel value $d_3$, and the corrected value is written into the second image memory 2 at the address designated by the second X address generation unit 11 and the second Y address generation unit 12.

When all the above operation is completed, the timing signal "b" is generated. Synchronized with the timing signal "b", the first X address generation unit 4 counts $L_x$. Concurrently, the width setting unit 6 generates a new Lx from a given thin out interval $K_x$ representing the thin out interval in the X direction. A new data reduction area in the first image memory 1 does not overlap with the right edge of the previous data reduction area. Also the width of the new data reduction area which is determined basing upon a $L_x$ value may differ from the previous data reduction area. Accordingly, the number of the pixels subjected to the current reduction operation varies from the previous reduction. Regardless of the change in the pixel number, the divider 9 can compute a normalized value precisely in accordance with the multiplication result of the multiplier 8.

When one-line reduced pixels are stored into the second image memory 2, the timing "c" is generated. Accordingly, the output $X_{ad}$ from the first X address generation unit 4 is reset to zero; the output $Y_{ad}$ from the first Y address generation unit 3 is incremented by L; and the length setting unit 5 generates a new $L_y$ in accordance with a given thin out interval $K_y$, $L_y$ representing length of new data reduction area. Repeating the above operation, reduction of the whole original image will be completed. The new $L_y$ being different from the previous $L_y$ indicates that the number of the pixels to be referred in the current reduction is different from the previous reduction.

DETAILED DESCRIPTION OF EACH COMPONENT

The major part of the image data processing device in FIG. 6 will be described in detail.

Width Setting Unit 6

Figure 9:
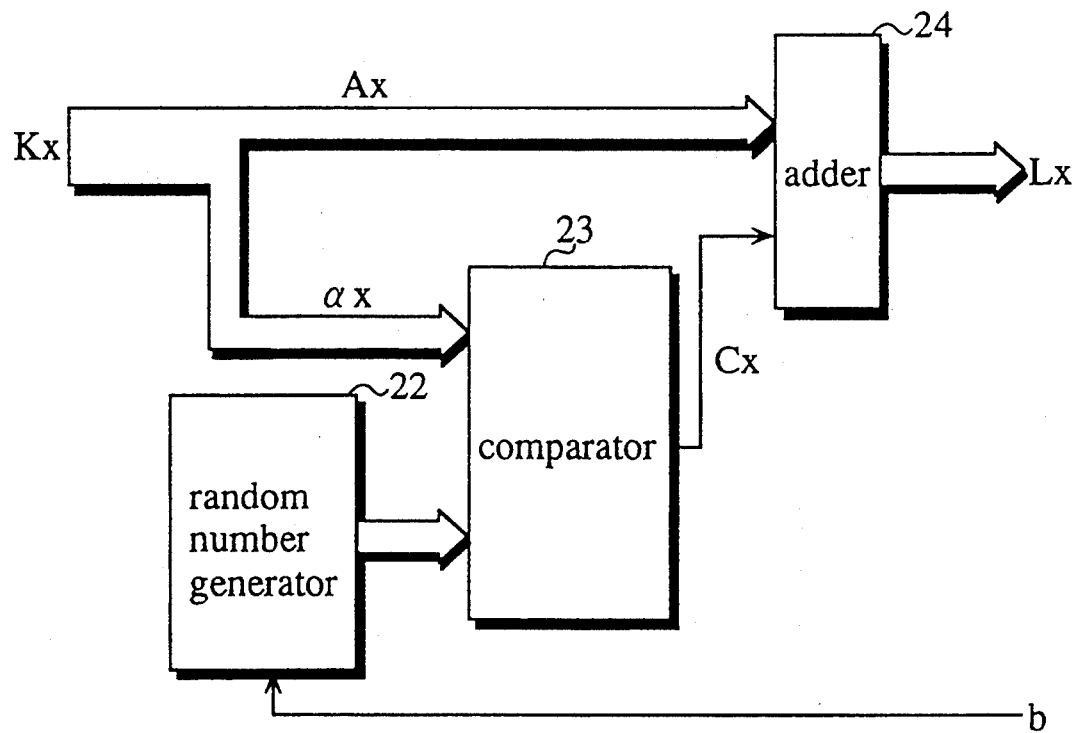
FIG. 9 shows construction of a width setting unit.

FIG. 9 is a block diagram showing detailed construction of the width setting unit 6 in FIG. 6. The width setting unit 6 comprises a random number generator 22, a comparator 23, and an adder 24. For each reduced pixel to be stored in the second image memory 2, the width setting unit 6 generates $A_x+1$ and $A_x$ each representing a width of the data reduction area in the first image memory 1 at x and probability respectively.

The random number generator 22 generates a 4-bit uniform random number.

The comparator 23 compares 4 bits of the floating-point part $\alpha_x$ of the thin out interval $K_x$ with an output R from the random number generator 22, and outputs $C_x=1$ when $\alpha_x$ is R or larger than the same while outputs $C_x=0$ when R is larger than $\alpha_x$.

The adder 24 figures out a width of the data reduction area, $L_x$, by adding an integer part $A_x$ of a thin out interval $K_x$ and a value of $C_x$ from the comparator 23.

An operation example of the width setting unit 6 will be described. For simplifying the description, a floating-point number is represented by 4 bits herein. A value of the thin out interval $K_x$ is divided into its integer part $A_x$ and its floating-point part $\alpha_x$; and the integer part $A_x$ and the floating-point part $\alpha_x$ are provided to the adder 24 and the comparator 23 respectively. The random number generator 22 generates a uniform four-bit random number R at each receipt of the timing signal "b". It is assumed that a random number R generated by the random number generator 22 is a fixed-point representation between 0/16 to 15/16 (0/16, 1/16, 2/16 ..., 15/16). The comparator 23 compares a four-bit random number R and a value of the floating-point part x; and outputs a carry signal $C_x=1$ when the is the random number R or larger than the same while it outputs a carry signal $C_x=0$ when the $\alpha_x$ is smaller than the random number R.

It is assumed that every one of the sixteen random numbers appears equally. Therefore, an expected value of the carry signal $C_x$ is $E(C_x)=\alpha_x$. Also an output $L_x$ from the X address setting unit 6 is computed by the adder 24 which adds a value of the integer part $A_x$ of the thin out interval $K_x$ and a value of the carry signal $C_x$; accordingly, the output $L_x$ will be $A_x+1$ when the carry signal $C_x$ is 1 while it will be $A_x$ when the carry signal $C_x$ is 0.

An expected value of the output $L_x$ is $E(L_x)=A_x+E(C_x)=A_x\alpha_x=K_x$; accordingly, $E(L_x)$ will coincide with a value of the thin out interval $K_x$ when a large number of pixels are employed. For effective operation of the random number generator 22, uniformity and dispersion characteristics, rather than a cycle characteristic, are importantly observed in generation of random numbers; accordingly, the random number generator 22 can be replaced by a binary counter or a Gray code counter.

The random number generator 22 herein generates random numbers by reversing an order of the weighting bit in a four-bit output from a binary counter. With such binary counter, a larger difference between the previous random number and the current random number occurs in a short cycle, so that the quality of the image will be enhanced with decreasing visible errors. To be precise, visible errors are shifted into a high frequency bandwidth to be removed by the low-pass filtering of the visual system.

Length Setting Unit 5

Figure 10:
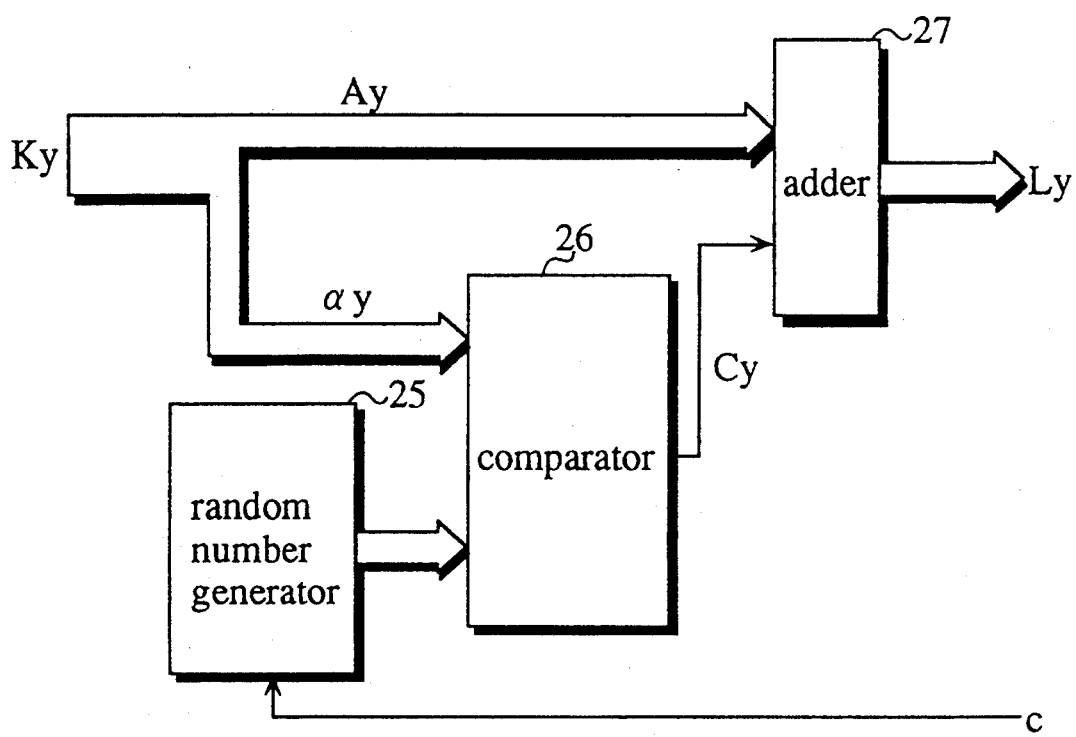
FIG. 10 shows construction of a length setting unit.

FIG. 10 shows construction of the length setting unit 5. In the figure, the length setting unit 5 comprises a random number generator 25, comparator 26, and an adder 27. At generation of each data line in the second image data memory 2, the length setting unit 6 generates $A_y+1$ and $A_y$ each representing length of the data reduction area in the second image memory at $\alpha_y$ and $1-\alpha_y$ probability respectively. Detailed operation of the length setting unit 5 is the same as the width setting unit 6, and will not be repeated herein.

Fist X Address Generation Unit 4

Figure 11:
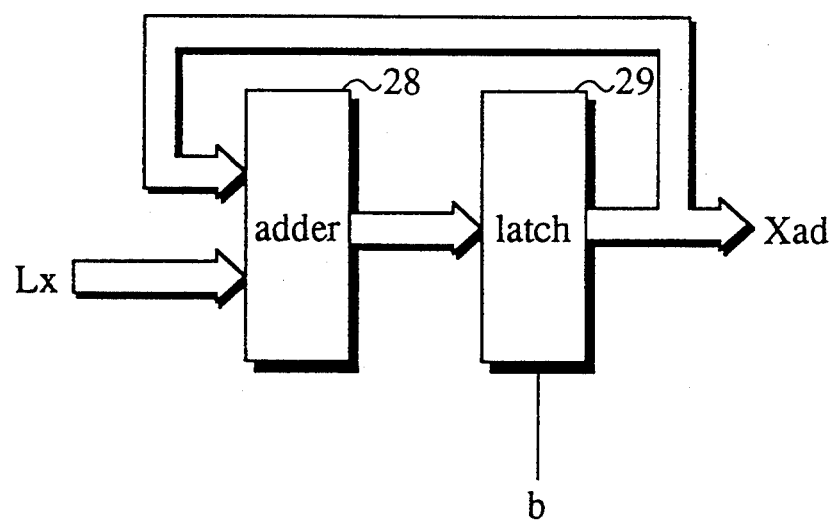
FIG. 11 shows construction of a first X address setting unit.

FIG. 11 shows construction of the first X address generation unit 4. In the figure, the first X address generation unit, comprises an adder 28 and a latch 29. The first X address generation unit 4 operates as an integrator by feeding back an output of the latch 29 to the adder 28. To be precise, synchronized with the timing signal "b", a new $L_x$ representing a width of a new data reduction area is added to the current reference address $X_{ad}$. Thus, a reference address $X_{ad}$ in the first image memory unit 1 is updated at each output of the timing signal "b".

First Y Address Generation Unit 3

The first Y address generation unit 3 operates the same as the first X address generation unit 4 in the above except that operation of the first Y address generation unit 3 is synchronized with the timing signal "c".

Integrator 7

Figure 8:
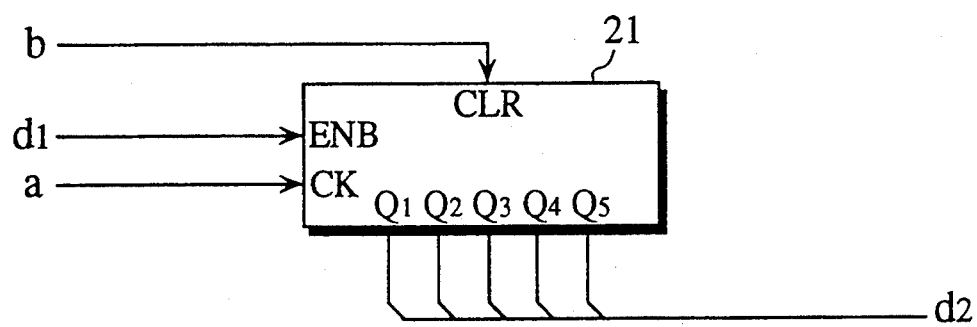
FIG. 8 shows construction of an adder.

FIG. 8 shows construction of the integrator 7. The integrator 7 is comprised of a binary counter 21 including an enable terminal besides a clock terminal and a clear terminal. The timing signal "a" is inputted to the clock terminal; a binary signal d (pixel level) outputted from the first image memory 1 is inputted to the enable terminal; and the timing signal "b" is inputted to the clear terminal. With such construction, the integrator 7 integrates the number of the binary signal "1", which represents either a black pixel or a white pixel. That is, at input of the timing signal b which represents start of the integrator 7, the binary counter 21 is initialized to zero and it counts the timing signal "a" only when the binary input is "1". Thus, the number of "1"s within the data reduction area (rectangle) in FIG. 7 will be figured out. The binary counter 21 herein is a five-bit counter, and it can count from 0 to 31. Accordingly, with the integrator 7, a data input can be reduced into around 1/5 in both the X and the Y directions.

Divider 9

The divider 9 normalizes the pixel levels by computing an average pixel level of the integrated pixels. That is, an integration value of the integrator 7 is divided by a size of the data reduction area. Since the number of the integrated pixels depends on the data reduction area herein, the pixel number ($L_x \cdot L_y$) is computed by the multiplier 8. The divider 9 divides a value of the output d$_2$ of the integrator 7 by a pixel number computed by the multiplier 8. The division result of the divider 9, representing a normalized output d$_3$, can be a floating number between 0 and 1 despite that input data is binary. Accordingly, a bit pattern at the floating-point part is converted into continuous-tone which reserve a necessary precision from the MSB (Most Significant Bit). For example, when keeping a 4-bit precision of continuous-tone data, a value of the normalized output d$_3$ placing between 0.0000–1.0000 will be replaced by 0.1111 except with the output d$_3$ of 1.0000. Thus, a bit pattern at the floating-point part can be converted into four-bit continuous-tone data between 0000–1111 easily.

γ Correction Unit 10

Figure 13:
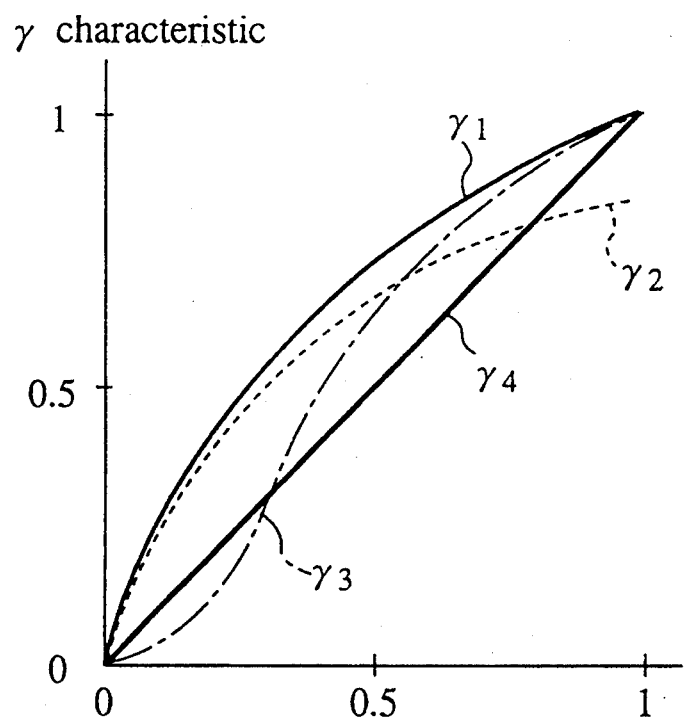
FIG. 13 shows characteristics of correction.

The y correction unit 10 corrects various non-linear factors caused by a change in quantity of light which continues until the reproduction of the image. The non-linear factors include a γ characteristic being unique to a CRT or a video printer, adjustment of the luminance and the contrast at a CRT, and a dot gain caused by the beam of a CRT or by an increase in the dot pitch at a printing device. The gamma correction contributes to the effective use of continuous-tone information, thereby visibility of the image is enhanced. The gamma correction is especially effective when the first image memory 1 holds binary image as is herein. When displaying the output from the image data processing device with the display device such as the CRT, the γ correction unit 10 proportions quantity of the output light to a level of the prey-level data computed by a filter comprised of the integrator 7 and the divider 9. To be concrete, the γ correction unit 10 employs a ROM table which holds four major y characteristics in FIG. 13.

The thick solid line in the figure corresponds to the ideal condition of the CRT. That is, the ideal γ characteristic (referred to as γ$_1$ characteristics) holds a power of 0.45 to correct a power of 2.2 characteristic at the CRT (generally the light output from the CRT is proportionate to the value computed by raising the input to 2.2th power.)

The broken line in the figure shows the γ characteristics at the CRT where the contrast is raised beforehand. Such γ characteristic (referred to as γ$_2$ characteristic) is observed in damaged continuous-tone information caused by the saturation of white level.

The characteristic represented by the dashed line in the figure (referred to as γ$_3$ characteristic) is observed with the CRT at which the black level is embossed by raising the luminance level or by reflecting the external light on the display surface.

The characteristic represented by the thin solid line in the figure (referred to as γ$_4$ characteristic) is observed at transfer of 3Linear data to an external device or at a display having a relatively linear characteristic, such as a liquid crystal display for displaying continuous-tone image with a pulse width modulation including a frame thin out reduction.

For example, it is assumed that binary image in the first image memory 1 represents a black thin line and it is to be reduced at a large reduction rate. In this case, the correction with the γ$_3$ characteristic can increase the thickness of the reduced line. That is, the thickness of the reduced line will be improved easily without expanding the original thin line. Herein a microcomputer operates γ$_1$–γ$_3$ corrections depending on a width of the original line and a reduction rate.

Operation Example

An operation example of the width setting unit 6 and the X address generation unit 4 will be described as referring to Table 1. The thin out reduction interval is the reverse of the width reduction rate, K$_x$=2.6875 in which the integer part is A$_x$=2 and the floating-point part is α$_x$=0.6875. Accordingly, the binary representation of the floating part α$_x$ is (0.1001).

TABLE 1

| times | random number R | C$_x$ | L$_x$ | Xad |
|---|---|---|---|---|
| 0 | .0000 | 1 | 3 | 0 |
| 1 | .1000 | 1 | 3 | 3 |
| 2 | .0100 | 1 | 3 | 6 |
| 3 | .1100 | 0 | 2 | 9 |
| 4 | .0010 | 1 | 3 | 11 |
| 5 | .1010 | 1 | 3 | 14 |
| 6 | .0110 | 1 | 3 | 17 |
| 7 | .1110 | 0 | 2 | 20 |
| 8 | .0001 | 1 | 3 | 22 |
| 9 | .1001 | 1 | 3 | 25 |
| 10 | .0101 | 1 | 3 | 28 |
| 11 | .1101 | 0 | 20 | 31 |
| 12 | .0011 | 1 | 3 | 33 |
| 13 | .1011 | 0 | 2 | 36 |
| 14 | .0111 | 1 | 3 | 38 |
| 15 | .1111 | 0 | 2 | 41 |
| 16 | .0000 | 1 | 3 | 43 |
| . | . | . | . | . |

The random numbers in the table are obtained by reversing an order of the weighting bit in a four-bit output from a binary counter, and a round has sixteen outputs. Also a value at higher digits are replaced by the other in short cycles, so that a value of C$_x$ changes in a short cycle. Consequently, the optical impression of the image will be enhanced. The carry signal C$_x$ is generated by the comparator 23, and the value of the carry signal C$_x$ is 1 when the value of the floating-part α$_x$ is the random number R or larger than the same while it becomes 1 when the value of C$_x$ is smaller than the random number R. The value of the width of the data reduction area, L$_x$ is an integer, and is obtained at the adder 24 by computing the sum of the integer part A$_x$ of the thin out reduction interval K$_x$ and the carry signal C$_x$. The X reference address X$_{ad}$ is computed at the first X address generation unit 4 by integrating the value of each data reduction area L$_x$.

In Table 1, L$_x$=3 appears eleven times and L$_x$=2 appears fives times out of the sixteen operations constituting a round; and the X reference address X$_{ad}$ after the round is X$_{ad}$=43. The average of the X reference address is 43/16=2.6875, which coincides with the desired thin out reduction interval K$_x$.

The operation of the length setting unit 5 and the first Y address generation unit 3 is the same as the above except that one round of the random numbers are generated at the timing "c".

Figure 12:
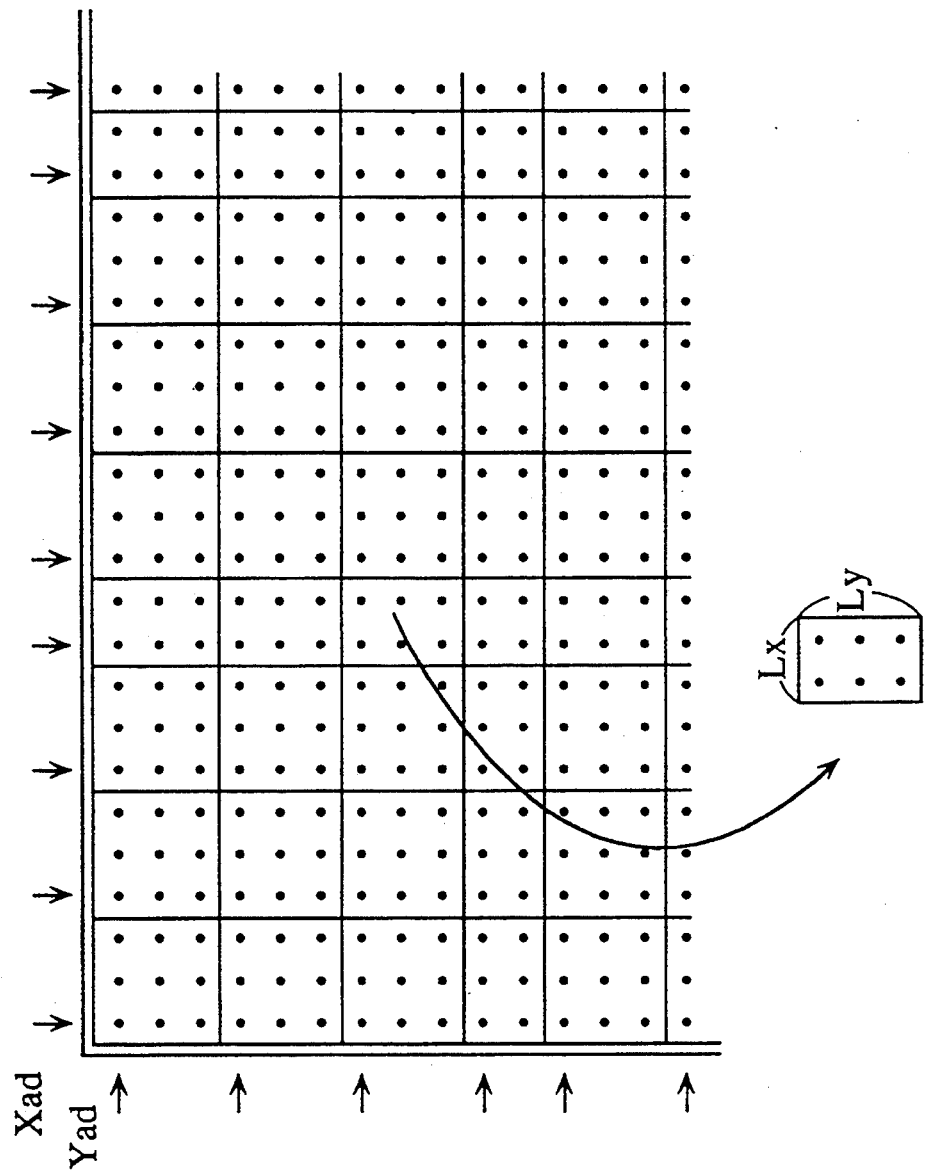
FIG. 12 illustrates the data reduction area of the first image memory.

FIG. 12 visualizes the data in Table 1, that is the location relation between the data reduction area (L$_x$.L$_y$) and the reference addresses (X$_{ad}$, Y$_{ad}$) is shown therein. Each dot in the figure represents a pixel in the original image; and a rectangle-shaped area represents a data reduction area in which the width and the length are L$_x$ and L$_y$ respectively. The X reference address X$_{ad}$ and the Y reference address Y$_{ad}$ represent the left end and the upper end of the data reduction area respectively. In the figure the data reduction area is filled with four sizes of cells, the cells represented by ($L_x$, $L_y$), ($L_{x+1}$, $L_y$), ($L_x$, $L_{y+1}$), ($L_{x+1}$, $L_{y+1}$). The data reduction area is filled with the four cells having no space therebetween, so that the reduction is operated without losing detail in the data and thereby the generation of moire noise is prevented. Consequently, the original image can be reduced without degrading the image quality. Also the average of the actual thin out intervals is the reverse of the reduction rate, so that reduction at any reduction rate can be realized.

Figure 14:
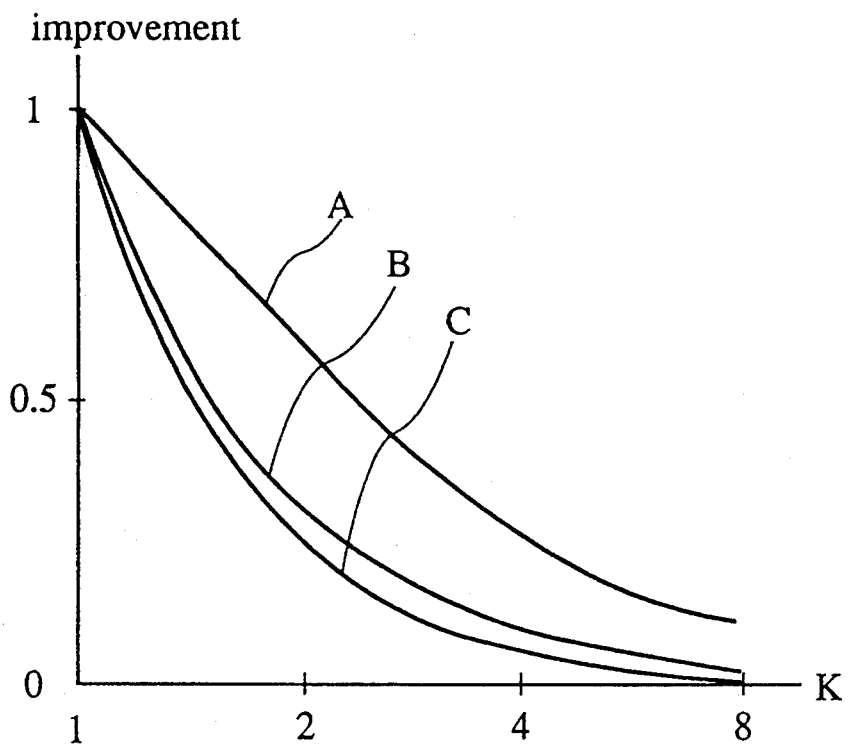
FIG. 14 illustrates improvement in image quality with the image data processing device of FIG. 6.

FIG. 14 shows effects of the image data processing device. The X axis and the Y axis in the figure represent a thin out reduction interval, which is the reverse of a reduction rate, and a relative information amount respectively. In the figure, the amount of the original information in the reduced image is 1 when the reduction rate is 1, and the ratio thereto for each reduction rate is shown. The information amount is expressed in bits. Following formula 1 shows the change in the information amount f(k) according to the conventional thin out reduction while formula 2 shows the change in the information amount g(k,p) according to the reduction method in this embodiment. It is determined herein that the number of bits for one pixel in the input image is p, and the reduction rate is 1/k.

$$f(k) = \frac{1}{k^2} \qquad \text{formula 1}$$

$$g(k,p) = \frac{\log_2 (2^p - 1) \cdot k^2 + 1)}{p \cdot k^2} \qquad \text{formula 2}$$

The characteristic C in the figure shows the characteristic f(k) in the formula 1, in which the amount of the original information is reduced into $\frac{1}{4}$ with the reduction rate of $\frac{1}{2}$ since three out of four pixels are disposed with that reduction rate.

The characteristic A in the figure shows the characteristic f(k,1) in the formula 2, in which binary input data is reduced. Different from the conventional reduction, the information to be thinned out is expressed in the form of tone, accordingly, the decrease in the original information amount is moderate even with the increase in the reduction rate. The improvement observed in the characteristic A from the characteristic C is twice with the reduction rate of $\frac{1}{2}$ and 4 times with the reduction rate of $\frac{1}{4}$.

The characteristic C in the figure shows f(k,8) in the formula 2, in which 8-bit gray-level input data is reduced. It is apparent that little improvement in the original information amount is observed in the characteristic C from the characteristic A for the simple thin out reduction.

Thus, it is found that with the image data processing device in this embodiment, visibility of the reduce image is improved significantly when binary input data is reduced, although significant improvement in visibility is not observed when gray-level input data is reduced. Further, owing to the simple construction of the device without integration and addition, rapid processing can be achieved with any reduction rate.

Figure 15:
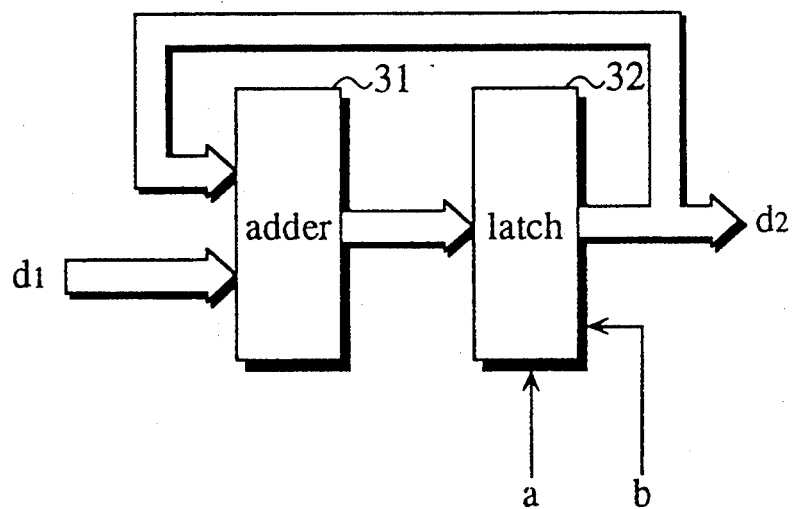
FIG. 15 shows construction of an adder in the image data processing device of FIG. 6.

Although binary input data is reduced in the above, gray-level input data can be reduced similarly with the image data processing device in FIG. 6. In the reduction of gray-level data, however, the integrator in the same figure must be replaced by the integrator in FIG. 15. The integrator in FIG. 15 is comprised of an adder 31 and a latch 32; and the latch 32 feeds back data to the adder 31. To be precise, being synchronized with the timing signal "b", the integrator 7 is initialized; while, being synchronized with the timing signal "a", the integrator 7 integrates pixel level $d_1$ of the gray-level data from the first image memory 1. The adder 31 increases the content of the latch 32 by adding thereto the number of the pixels included in the data reduction area, represented by the rectangle in FIG. 7. As a result, the integration result remains at the latch 32. Subsequently, the latch 32 is initialized to 0 at the timing signal "b" so that another integration can be operated. The bit numbers at the adder 31 and the latch 32 are determined in accordance with the bit number of the gray-level data d as well as the reduction rate. When reducing gray-level data, floating-point bits are outputted at below of the integer bits; consequently, the improvement in Signal-to-Noise ratio can be achieved.

Thus, witch gray-level input data, the improvement in image quality, instead of visibility, can be achieved. That is, it is apparent from FIG. 12 that every original pixel information is reflected in the output pixel. Also with the low-pass filter characteristic in FIG. 4(B) the frequencies at more than half of the bandwidth are attenuated; accordingly, the image quality can be improved by reducing the noise caused by aliasing noises, such as moire. Also, the reduction at a reduction rate 1/b where b is non-integer can be realized. The large-size input data in FIG. 5(B) can be reduced with the simple construction of the device excluding a weighting filter. Further, the rapid reduction operation is achieved by excluding any overlap between the original pixels.

For either of binary data or gray-level data at the first image memory 1, the length setting unit 5 and the width setting unit 6 can be constructed as follows.

Figure 16:
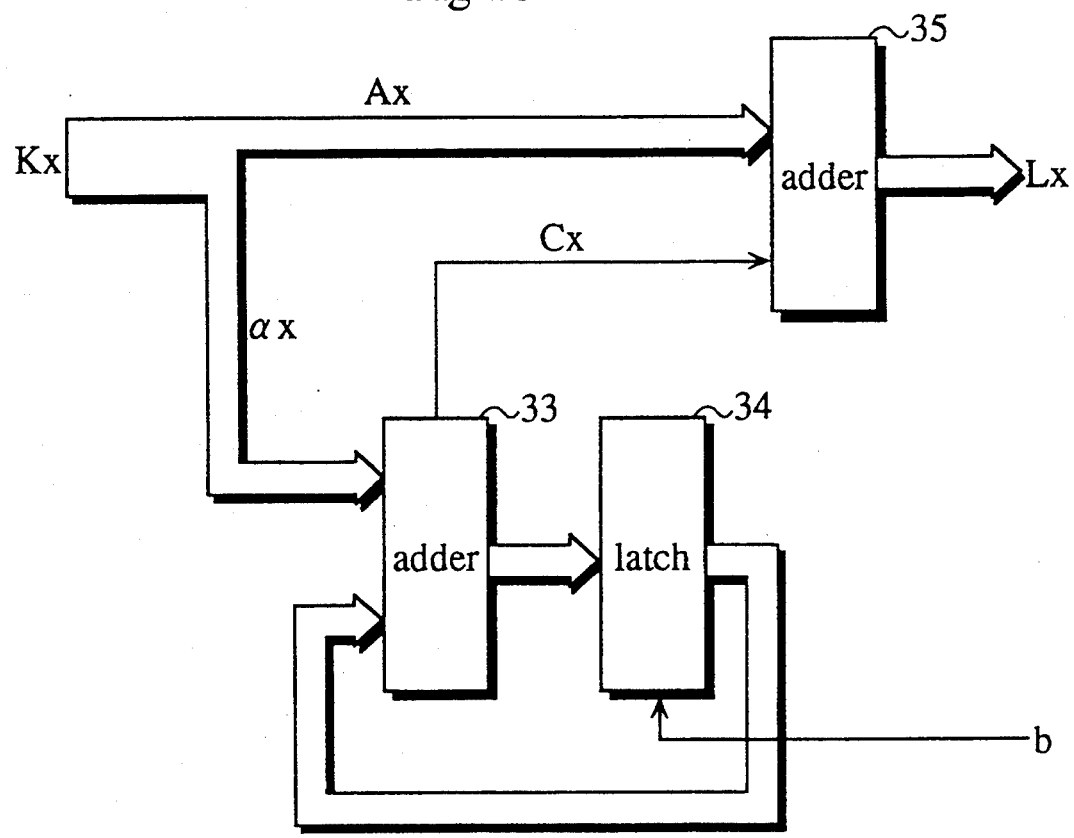
FIG. 16 shows another construction of the width setting unit.

FIG. 16 shows another construction of the width setting unit 6. In the figure, the width setting unit 6 comprises an adder 33, a latch 34, and an adder 35. The adder 33 and the latch 34 constitute an integrator. Synchronized with the timing b, the integrator computes the sum of the floating-point part $a_x$ of the thin out reduction interval in the X direction, $K_x$. The adder 33 holds only effective digits of the floating-point part, and generates a carry signal $C_x$ at each shift of the digit to the integer part. The adder 35 generates a data reduction area $L_x$ by adding the thin out reduction interval $K_x$, the integer part $A_x$, and the carry signal $C_x$. It is also true with this construction that the carry signal $C_x$ is generated more frequently when a floating point number $a_x$ is large. Actually, an expected value for generation of the carry signal $C_x$ coincides with the value of the floating-point part $a_x$. With the above construction, the width setting unit 6 operates substantially same as the embodiment.

Figure 17:
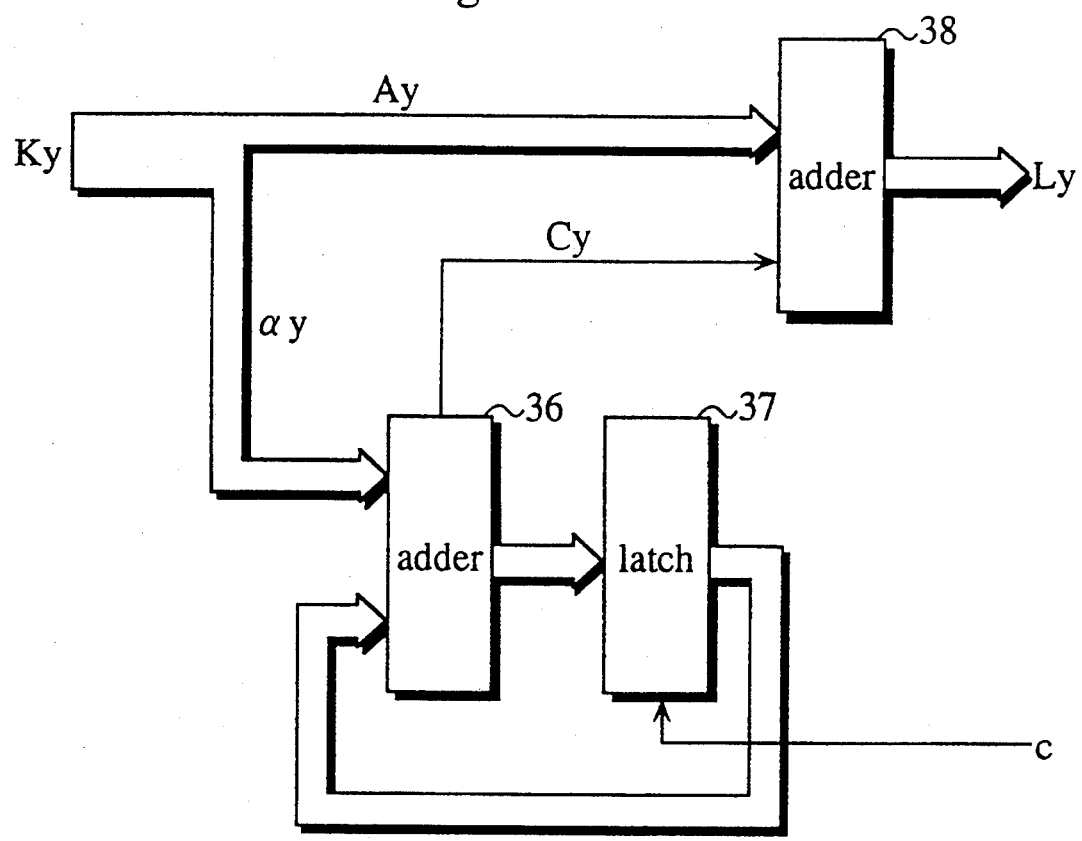
FIG. 17 shows another construction of the length setting unit.

Similarly, the length setting unit 5 can be constructed as in FIG. 17. The length setting unit 5 in the figure comprises an adder 36, a latch 37, and an adder 38; and it operates the same as the width setting unit 6 in FIG. 16 except that it operates in accordance with the timing signal c.

Although the γ correction unit 10 is comprised of a ROM table in the above, it can be comprised of a RAM table. When employing a RAM table, each characteristic curve may be Generated by a microcomputer. A microcomputer obtains characteristic curve by making approximate calculation of functions or the like.

Although a whole input image area in the first image memory 1 is subjected to the reduction operation in the above, a part of the input image area may be subjected to the same operation by setting the reference addresses $X_{ad}$, $Y_{ad}$ according to the reduced part.

Although the reduce Gray-level image data are stored in the second image memory 2 in the above, they can be stored in an external storage operating equivalent to the second image memory 2.

The first image memory 1 may be a line memory with a minimum number of lines. In this case, the length setting unit stores a part of the input data into line memory part by part.

Although the device is realized by hardware in the above, it can be realized by software at high-speed processor such as a DSP.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image data processing device for converting first image data into second image data by reducing the first image data horizontally at a reduction rate of $1/K_x$ while reducing the first image data vertically at a reduction rate of $1/K_y$, in which integer parts of $K_x$ and $K_y$ are $A_x$ and $A_y$, respectively, while floating-point parts of $K_x$ and $K_y$ are $\alpha_x$ and $\alpha_y$, respectively, the image data processing device comprising:

area setting means for setting a rectangle-shaped area of the first image data which corresponds to each pixel of the second image data, the rectangle-shaped area having $L_y$ pixel lines and $L_x$ pixel columns, in which $L_y$ is $A_y-1$ at a probability of $\alpha_y$ and $A_y$ at a probability of $1-\alpha_y$ while $L_x$ is $A_x+1$ at a probability of $\alpha_x$ and $A_x$ at a probability of $1-\alpha_x$; and operation means for integrating a pixel level of each rectangle-shaped area, and obtaining gray-level pixel data by applying a predetermined operation to the integration result.

2. The image data processing device of claim 1 further comprising:

a first memory for holding said first image data to be reduced; and area readout means for reading out a pixel level of every pixel held in each rectangle-shaped area, and outputting the pixel levels to said operation means.

3. The image data processing device of claim 2 further comprising:

a second memory having an area where said gray-level pixel data will be stored; and writing means for writing the gray-level pixel data into the second memory, the gray-level pixel data corresponding to the rectangle-shaped area of the first memory.

4. The image data processing device of claim 3, wherein the area setting means is comprised of:

length setting means for setting a value of $L_y$ which represents a length of the rectangle-shaped area, the length placing between two ends of the first image data along with Y axis; and width setting means for setting a value of $L_x$ which represents a width of the rectangle-shaped area, the width placing between two ends of the first image data along with X axis.

5. The image data processing device of claim 4, wherein the length setting means is comprised of:

a random number generator for generating a uniform random number for each rectangle-shaped area, the uniform random number placing a range between 0 and 1 inclusive;

a comparator for comparing the random number from the random number generator with $\alpha_y$, and outputting 1 when $\alpha_y$ is larger than the random number or the same while outputting 0 when $\alpha_y$ is smaller than the random number; and an adder for computing $L_y$ by adding the output of comparator to the integer part $A_y$.

6. The image data processing device of claim 5, wherein the random number generator has a binary counter, and outputs a random number by reversing an order of a weighting bit in an output from the binary counter.

7. The image data processing device of claim 4, wherein the length setting unit is comprised of:

an integrator for integrating a significant bit in the floating-point part $\alpha_y$ at each set timing of $L_y$, and outputting a carry signal representing a carry from the decimal high-order position; and an adder for computing L by adding the carry signal from the integrator and the integer part $A_y$.

8. The image data processing device of claim 7, wherein the integrator includes an adder and a latch, in which the adder adds an output of the latch and a significant bit included in the floating-point part $\alpha_y$ at each set timing of $L_y$, then outputs the carry signal while the latch latches the addition result of the adder.

9. The image data processing device of claim 4, wherein the width setting means is comprised of:

a random number generator for generating a uniform random number for each rectangle-shaped area, the uniform random number placing within a range between 0 and 1 inclusive;

a comparator for comparing the random number from the random number generator with $\alpha_x$, and outputting 1 when $\alpha_x$ is larger than the random number or the same while outputting 0 when $\alpha_x$ is smaller than the random number; and an adder for computing $L_x$ by adding the output of comparator to $A_x$.

10. The image data processing device of claim 9, wherein the random number generator has a binary counter, and outputs a random number by reversing an order of a weighting bit in an output from the binary counter.

11. The image data processing device of claim 10, wherein the width setting unit is comprised of:

an integrator for integrating a significant bit in the floating-point part $\alpha_x$ at each set timing of $L_x$, and outputting a carry signal representing a carry from the decimal high-order position; and an adder for computing $L_x$ by adding the carry signal from the integrator and the integer part $A_x$.

12. The image data processing device of claim 11, wherein the integrator includes an adder and a latch, in which the adder adds an output of the latch and a significant bit included in the floating-point part y at each set timing of $L_y$, then outputs the carry signal while the latch latches the addition result of the adder.

13. The image data processing device of claim 3, wherein the area readout means is comprised of:

a Y address generation unit for generating a Y address one by one, the Y address representing Y coordinate of each pixel which places between two ends of the rectangle-shaped area, the two ends placing vertically opposite to each other;

an X address generation unit for generating an X address at each generation of the Y address, the X address representing X coordinate of each pixel which places between two ends of the rectangle-shaped area, the two ends placing in the direction of X axis; and a readout unit for reading out a pixel level of a pixel designated by said X address and Y address.

14. The image data processing device of claim 13, wherein the X address generation unit is comprised of:
a reference X address generation unit for generating a reference X address which represents pixels placing at left ends of the rectangle-shaped area set by the area setting means;
an X address counter for incrementing itself by one at a timing of a cycle count representing readout of one pixel, the X address counter counting from 0 up to $L_x-1$; and
an X address adder for adding the reference X address and a counting number at the X address counter, and outputting the addition result to the first memory.

15. The image data processing device of claim 14, wherein the reference X address generation unit is comprised of:
a reference X address register for holding the reference X address; and
a reference X address adder for, at each readout of all pixels included in the rectangle-shaped area, adding what is stored in the reference X address register and a value of $L_x$ of another rectangle-shaped area which is determined by the area setting means to be processed next, and storing the addition result into the reference X address register.

16. The image data processing device of claim 15, wherein the reference X address register is initialized with an X address representing a left end of the first image data.

17. The image data processing device of claim 14, wherein the Y address generation unit is comprised of:
a reference Y address generation unit for generating a reference Y address which represents pixels placing at left ends of the rectangle-shaped area set by the area setting means;
a Y address counter for incrementing itself by one at a timing of a cycle count representing readout of one pixel, the Y address counter counting from 0 up to $L_y-1$; and
a Y address adder for adding the reference Y address and a counting number at the Y address counter, and outputting the addition result to the first memory,
wherein the X address counter counts from 0 to $L_x-1$ repeatedly, and generates a carry signal at each reset thereof to 0, and outputs the carry signal as the count clock to the Y address counter.

18. The image data processing device of claim 17, wherein the reference Y address generation unit is comprised of:
a reference Y address register for holding the reference Y address; and
a reference Y address adder for, at each readout of all pixels included in the rectangle-shaped area, adding what is stored in the reference Y address register and a value of $L_x$ of another rectangle-shaped area which is determined by the area setting means to be processed next, and storing the addition result into the reference Y address register.

19. The image data processing device of claim 18, wherein the reference Y address register is initialized with a Y address representing an upper end of the first image data.

20. The image data processing device of claim 3 wherein the operation means is comprised of:
a calculation unit for counting the number of pixels representing a same color, either black or white, out of the pixels read out by the area read out means for each rectangle-shaped area;
a multiplier for computing $L_x.L_y$ of the rectangle-shaped area which is subjected to the counting operation by the calculation unit;
a divider for obtaining gray-level pixel data by dividing the counting number at the calculation unit by the multiplication result of the multiplier,
wherein the first image data stored in the first memory is binary data.

21. The image data processing device of claim 20, wherein the calculation unit is comprised of a binary counter having an enable terminal, a clock terminal, and a clear terminal, each of which receives the pixel level, the count clock, and a signal respectively, the pixel level read out by the area readout means, the count clock indicating the cycle for reading out one pixel., and the signal indicating that another rectangle-shaped area is newly set by the area setting means.

22. The image data processing device of claim 21 further comprising correction means for correcting non-linear factors of an image output device, the image output device outputting an image of the second image data, the second image data being the gray-level pixel data obtained by the divider.

23. The image data processing device of claim 22, wherein the correction means corrects at least one of a $\gamma$ characteristic being unique to a Cathode Ray Tube (CRT) and a $\gamma$ characteristic being unique to a video printer.

24. The image data processing device of claim 23, wherein the correction means has a lookup table which indicates a plurality of input/output characteristics which correct non-linear factors of various image output devices, each of the input/output characteristics being selected in accordance with the selected image output device.

25. The image data processing device of claim 23, wherein the correction means has a lookup table which indicates a plurality of input/output characteristics, each of the input/output characteristics being selected in accordance with a sort of the first image data and a reduction rate.

26. The image data processing device of claim 5, wherein the operation means is comprised of:
an accumulator for computing a sum of the pixel levels read out by the area readout means for each rectangle-shaped area;
a multiplier for computing $L_x.L_y$ of the rectangle-shaped area, the rectangle-shaped area whose pixel levels are totaled by the accumulator; and
a divider for obtaining gray-level pixel data by dividing the sum at the accumulator by the multiplication result of the multiplier, wherein the first image data stored in the first memory is gray-level data.

27. The image data processing device of claim 26, wherein the accumulator has an adder and a latch, and the adder adds the gray-level pixel data read out by the area readout means and an output of the latch while the latch latches the addition result of the adder.

28. The image data processing device of claim 27 further comprising correction means for correcting non-linear factors of an image output device, the image output device outputting an image of the second image data, the second image data being the gray-level pixel data obtained by the divider.

29. The image data processing device of claim 28, wherein the correction means corrects at least one of a $\gamma$ characteristic being unique to a Cathode Ray Tube (CRT) and a $\gamma$ characteristic being unique to a video printer.

30. The image data processing device of claim 29, wherein the correction means has a lookup table which indicates a plurality of input/output characteristics which correct non-linear factors of various image output devices, each of the input/output characteristics being selected in accordance with the selected image output device.

31. The image data processing device of claim 29, wherein the correction means has a lookup table which indicates a plurality of input/output characteristics, each of the input/output characteristics being selected in accordance with a sort of the first image data and a reduction rate.

32. An image data processing device for converting first image data into second image data by reducing the first image data horizontally at a reduction rate of $1/K_x$ while reducing the first image data vertically at a reduction rate of $1/K_y$, in which integer parts of $K_x$ and $K_y$ are $A_x$ and $A_y$, respectively while floating-point parts of $K_x$ and $K_y$ are $\alpha_x$ and $\alpha_y$, respectively, the image data processing device comprising:
  a first memory for holding said first image data to be reduced;
  a second memory having an area where said gray-level pixel data will be stored;
  area setting means for setting a rectangle-shaped area of the first image data which corresponds to each pixel of the second image data, the rectangle-shaped area having $L_y$ pixel lines and $L_x$ pixel columns, in which $L_y$ is $A_y+1$ at a probability of $\alpha_y$ and $A_y$ at a probability of $1-\alpha_y$ while $L_x$ is $A_x+1$ at a probability of $\alpha_x$ and $A_x$ at a probability of $1-\alpha_x$;
  area readout means for reading out a pixel level of every pixel held in each rectangle-shaped area, and outputting the pixel levels to said operation means;
  operation means for integrating a pixel level of each rectangle-shaped area, and obtaining gray-level pixel data by applying a predetermined operation to the integration result; and
  writing means for writing the gray-level pixel data into the second memory, the gray-level pixel data corresponding to the rectangle-shaped area of the first memory.

33. The image data processing device of claim 32, wherein the area setting means is comprised of:
  length setting means for setting a value of $L_y$ which represents a length of the rectangle-shaped area, the length placing between two ends of the first image data along with Y axis; and
  width setting means for setting a value of $L_x$ which represents a width of the rectangle-shaped area, the width placing between two ends of the first image data along with X axis.

34. The image data processing device of claim 33, wherein the length setting means is comprised of:
  a random number generator for generating a uniform random number for each rectangle-shaped area, the uniform random number placing a range between 0 and 1 inclusive;
  a comparator for comparing the random number from the random number generator with $\alpha_y$, and outputting 1 when $\alpha_y$ is larger than the random number or the same while outputting 0 when $\alpha_y$ is smaller than the random number; and
  an adder for computing $L_y$ by adding the output of comparator to the integer part $A_y$.

35. The image data processing device of claim 34, wherein the random number generator has a binary counter, and outputs a random number by reversing an order of a weighting bit in an output from the binary counter.

36. The image data processing device of claim 33, wherein the length setting unit is comprised of:
  an integrator for integrating a significant bit in the floating-point part $\alpha_y$ at each set timing of $L_y$, and outputting a carry signal representing a carry from the decimal high-order position; and
  an adder for computing $L_y$ by adding the carry signal from the integrator and the integer part $A_y$.

37. The image data processing device of claim 36, wherein the integrator includes an adder and a latch, in which the adder adds an output of the latch and a significant bit included in the floating-point part at each set timing of $L_y$, then outputs the carry signal while the latch latches the addition result of the adder.

38. The image data processing device of claim 33, wherein the width setting means is comprised of:
  a random number generator for generating a uniform random number for each rectangle-shaped area, the uniform random number placing within a range between 0 and 1 inclusive;
  a comparator for comparing the random number from the random number generator with $\alpha_x$, and outputting 1 when $\alpha_x$ is larger than the random number or the same while outputting 0 when $\alpha_x$ is smaller than the random number; and
  an adder for computing $L_x$ by adding the output of comparator to $A_x$.

39. The image data processing device of claim 38, wherein the random number generator has a binary counter, and outputs a random number by reversing an order of a weighting bit in an output from the binary counter.

40. The image data processing device of claim 33, wherein the width setting unit is comprised of:
  an integrator for integrating a significant bit in the floating-point part $\alpha_x$ at each set timing of $L_x$, and outputting a carry signal representing a carry from the decimal high-order position; and
  an adder for computing $L_x$ by adding the carry signal from the integrator and the integer part $A_x$.

41. The image data processing device of claim 40, wherein the integrator includes an adder and a latch, in which the adder adds an output of the latch and a significant bit included in the floating-point part $\alpha_y$ at each set timing of $L_y$, then outputs the carry signal while the latch latches the addition result of the adder.

42. The image data processing device of claim 33, wherein the area readout means is comprised of:

a Y address generation unit for generating a Y address one by one, the Y address representing Y coordinate of each pixel which places between two ends of the rectangle-shaped area, the two ends placing vertically opposite to each other;

an X address generation unit for generating an X address at each generation of the Y address, the X address representing X coordinate of each pixel which places between two ends of the rectangle-shaped area, the two ends placing in the direction of X axis; and a readout unit for reading out a pixel level of a pixel designated by said X address and Y address.

43. The image data processing device of claim 42, wherein the X address generation unit is comprised of:

a reference X address generation unit for generating a reference X address which represents pixels placing at left ends of the rectangle-shaped area set by the area setting means;

an X address counter for incrementing itself by one at a timing of a cycle count representing readout of one pixel, the X address counter counting from 0 up to $L_x-1$; and an X address adder for adding the reference X address and a counting number at the X address counter, and outputting the addition result to the first memory.

44. The image data processing device of claim 43, wherein the reference X address generation unit is comprised of:

a reference X address register for holding the reference X address; and a reference X address adder for, at each readout of all pixels included in the rectangle-shaped area, adding what is stored in the reference X address register and a value of $L_x$ of another rectangle-shaped area which is determined by the area setting means to be processed next, and storing the addition result into the reference X address register.

45. The image data processing device of claim 44, wherein the reference X address register is initialized with an X address representing a left end of the first image data.

46. The image data processing device of claim 43, wherein the Y address generation unit is comprised of:

a reference Y address generation unit for generating a reference Y address which represents pixels placing at left ends of the rectangle-shaped area set by the area setting means;

a Y address counter for incrementing itself by one at a timing of a cycle count representing readout of one pixel, the Y address counter counting from 0 up to $L_y-1$; and a Y address adder for adding the reference Y address and a counting number at the Y address counter, and outputting the addition result to the first memory, wherein the X address counter counts from 0 to $L_x-1$ repeatedly, and generates a carry signal at each reset thereof to 0, and outputs the carry signal as the count clock to the Y address counter.

47. The image data processing device of claim 46, wherein the reference Y address generation unit is comprised of:

a reference Y address register for holding the reference Y address; and a reference Y address adder for, at each readout of all pixels included in the rectangle-shaped area, adding what is stored in the reference Y address register and a value of $L_x$ of another rectangle-shaped area which is determined by the area setting means to be processed next, and storing the addition result into the reference Y address register.

48. The image data processing device of claim 47, wherein the reference Y address register is initialized with a Y address representing an upper end of the first image data.

49. The image data processing device of claim 42 wherein the operation means is comprised of:

a calculation unit for counting the number of pixels representing a same color, either black or white, out of the pixels read out by the area read out means for each rectangle-shaped area;

a multiplier for computing $L_x \cdot L_y$ of the rectangle-shaped area which is subjected to the counting operation by the calculation unit;

a divider for obtaining gray-level pixel data by dividing the counting number at the calculation unit by the multiplication result of the multiplier, wherein the first image data stored in the first memory is binary data.

50. The image data processing device of claim 49, wherein the calculation unit is comprised of a binary counter having an enable terminal, a clock terminal, and a clear terminal, each of which receives the pixel level, the count clock, and a signal respectively, the pixel level read out by the area readout means, the count clock indicating the cycle for reading out one pixel, and the signal indicating that another rectangle-shaped area is newly set by the area setting means.

51. The image data processing device of claim 49 further comprising correction means for correcting non-linear factors of an image output device, the image output device outputting an image of the second image data, the second image data being the gray-level pixel data obtained by the divider.

52. The image data processing device of claim 51, wherein the correction means corrects at least one of a $\gamma$ characteristic being unique to a Cathode Ray Tube (CRT) and a $\gamma$ characteristic being unique to a video printer.

53. The image data processing device of claim 52, wherein the correction means has a lookup table which indicates a plurality of input/output characteristics which correct nonlinear factors of various image output devices, each of the input/output characteristics being selected in accordance with the selected image output device.

54. The image data processing device of claim 52, wherein the correction means has a lookup table which indicate a plurality of input/output characteristics, each of the input/output characteristics being selected in accordance with a sort of the first image data and a reduction rate.

55. The image data processing device of claim 42, wherein the operation means is comprised of:

an accumulator for computing a sum of the pixel levels read out by the area readout means for each rectangle-shaped area;

a multiplier for computing $L_x \cdot L_y$ of the rectangle-shaped area, the rectangle-shaped area whose pixel levels are totaled by the accumulator; and a divider for obtaining gray-level pixel data by dividing the sum at the accumulator by the multiplication result of the multiplier, wherein the first image data stored in the first memory is gray-level data.

56. The image data processing device of claim 55, wherein the accumulator has an adder and a latch and the adder adds the gray-level pixel data read out by the area readout means and an output of the latch while the latch latches the addition result of the adder.

57. The image data processing device of claim 55 further comprising correction means for correcting non-linear factors of an image output device, the image output device outputting an image of the second image data, the second image data being the gray-level pixel data obtained by the divider.

58. The image data processing device of claim 57, wherein the correction means corrects at least one of a $\gamma$ characteristic being unique to a Cathode Ray Tube (CRT) and a $\gamma$ characteristic being unique to a video printer.

59. The image data processing device of claim 58, wherein the correction means has a lookup table which indicates a plurality of input/output characteristics which correct non-linear factors of various image output devices, each of the input/output characteristics being selected in accordance with the selected image output device.

60. The image data processing device of claim 59, wherein the correction means has a lookup table which indicate a plurality of input/output characteristics, each of the input/output characteristics being selected in accordance with a sort of the first image data and a reduction rate.

* * * * *